(12) United States Patent
Kim et al.

(10) Patent No.: US 11,540,102 B2
(45) Date of Patent: Dec. 27, 2022

(54) METHOD FOR FUNCTION CONTROL AND ELECTRONIC DEVICE THEREOF

(71) Applicant: Samsung Electronics Co., Ltd., Suwon-si (KR)

(72) Inventors: Seok-Tae Kim, Daejeon (KR); Hyun-Mi Park, Seoul (KR); Hye-Bin Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 16/459,108

(22) Filed: Jul. 1, 2019

(65) Prior Publication Data
US 2019/0327594 A1 Oct. 24, 2019

Related U.S. Application Data

(63) Continuation of application No. 14/322,882, filed on Jul. 2, 2014, now abandoned.

(30) Foreign Application Priority Data

Jul. 2, 2013 (KR) .......................... 10-2013-0077455

(51) Int. Cl.
*H04W 4/70* (2018.01)
*H04W 4/02* (2018.01)
(Continued)

(52) U.S. Cl.
CPC .............. *H04W 4/70* (2018.02); *G06F 3/017* (2013.01); *H04L 51/224* (2022.05); *H04L 67/55* (2022.05); *H04W 4/027* (2013.01); *H04W 4/80* (2018.02)

(58) Field of Classification Search
CPC ......... H04W 4/70; H04W 4/80; H04W 4/027; H04W 4/008; H04W 4/206; H04L 51/24; H04L 67/26; G06F 3/017
See application file for complete search history.

(56) References Cited

U.S. PATENT DOCUMENTS

| 9,454,251 B1 | 9/2016 | Guihot |
| 2010/0120406 A1 | 5/2010 | Banga et al. |

(Continued)

FOREIGN PATENT DOCUMENTS

KR 10-2009-0084634 A 8/2009

OTHER PUBLICATIONS

Notice of Patent Grant dated Dec. 20, 2019 in connection with Korean Patent Application No. 10-2013-0077455, 3 pages.
(Continued)

*Primary Examiner* — Muhammad Raza

(57) ABSTRACT

A method of the present disclosure includes confirming second state information received from a second electronic device, confirming first state information of the first electronic device, comparing the first state information and the second state information with pre-set state information, and performing a function of the second electronic device by switching to the first electronic device according to the comparison result. Accordingly, since the first electronic device can be selected and controlled with a gesture or motion agreed between the first electronic device and the second electronic device, security can be enforced by avoiding an accident of data leakage, and selecting the second electronic device for controlling can be decreased.

18 Claims, 10 Drawing Sheets

(51) Int. Cl.
*H04W 4/80* (2018.01)
*G06F 3/01* (2006.01)
*H04L 51/224* (2022.01)
*H04L 67/55* (2022.01)

(56) References Cited

U.S. PATENT DOCUMENTS

| | | | | |
|---|---|---|---|---|
| 2010/0227642 A1* | 9/2010 | Kim | ............ | H04M 1/0256 455/556.1 |
| 2010/0257251 A1 | 10/2010 | Mooring et al. | | |
| 2012/0009916 A1* | 1/2012 | Prikowitsch | .......... | G06F 16/273 455/422.1 |
| 2013/0046893 A1 | 2/2013 | Hauser et al. | | |
| 2013/0110978 A1* | 5/2013 | Gordon | ............ | H04N 21/4788 709/218 |
| 2013/0169571 A1 | 7/2013 | Gai et al. | | |
| 2013/0219303 A1 | 8/2013 | Eriksson et al. | | |
| 2013/0325922 A1* | 12/2013 | Chaudhri | ............ | G06Q 10/10 709/203 |
| 2014/0120988 A1 | 5/2014 | Gunn et al. | | |
| 2014/0149859 A1 | 5/2014 | Van Dyken et al. | | |
| 2014/0206287 A1* | 7/2014 | Chang | ............ | H04W 4/025 455/41.2 |
| 2014/0223542 A1* | 8/2014 | Hicks | ............ | G06F 21/45 726/16 |
| 2014/0273975 A1* | 9/2014 | Barat | ............ | H04W 4/12 455/412.2 |
| 2014/0334271 A1* | 11/2014 | Park | ............ | G04G 21/08 368/10 |
| 2014/0365580 A1* | 12/2014 | Azenkot | ............ | H04W 4/026 709/205 |
| 2014/0369483 A1* | 12/2014 | Lovitt | ............ | G06F 3/017 379/202.01 |

OTHER PUBLICATIONS

Korean Intellectual Property Office, "Notice of Preliminary Rejection," Application No. KR 10-2013-0077455, dated Jun. 5, 2019, 25 pages.

* cited by examiner

METHOD FOR FUNCTION CONTROL AND ELECTRONIC DEVICE THEREOF

CROSS-REFERENCE TO RELATED APPLICATIONS

This application is a continuation of application Ser. No. 14/322,882, filed Jul. 2, 2014, which claims priority to Korean Patent Application No. 10-2013-0077455, filed Jul. 2, 2013, the entire disclosures of which are hereby incorporated by reference.

BACKGROUND

1. Field

The present disclosure relates to a method of controlling a function and an electronic device thereof.

2. Description of Related Art

With the development of a mobile communication technique, an electronic device is used as an essential communication device of individual users. Moreover, in addition to a voice communication function of the electronic device, the electronic device provides various additional services such as a camera, data communication, video playback, audio playback, a messenger, scheduling, an alarm function, and the like. Accordingly, the electronic device uses various programs capable of using these functions, thereby being able to control various electronic devices.

Conventionally, the electronic device can be connected to a peer electronic device through network communication, and can determine the peer electronic device to be controlled by using the electronic device from a setup menu. After performing a preliminary operation for determining from the setup menu a function of the peer electronic device to be controlled by using the electronic device, an operation of the peer electronic device can be controlled by using the electronic device.

In addition, if identification information of a device is not clearly known when the electronic device determines a peer electronic device for transmitting data, there may be an accident in which the data is transmitted to an unintended second electronic device.

SUMMARY

To address the above-discussed deficiencies, it is a primary object to provide a function control method in which a setup menu is not used when a second electronic device is controlled by using a first electronic device, and an electronic device using the method.

Another aspect of the present disclosure is to provide a function control method for allowing a second electronic device to perform a function of a first electronic device, and an electronic device using the method.

In accordance with an aspect of the present disclosure, a method of operating a first electronic device is provided. The method includes operation of transmitting information of a generated event to a second electronic device, receiving state information of the second electronic device, comparing state information of the first electronic device and the state information of the second electronic device with pre-set state information, and providing the event from the first electronic device on the basis of the comparison result.

In accordance with another aspect of the present disclosure, a method of operating a second electronic device connected with a first electronic device is provided. The method includes operation of providing an event, sensing state information and comparing with pre-set state information, and transmitting a message related to the state information and the event to the second electronic device on the basis of the comparison result.

In accordance with another aspect of the present disclosure, a first electronic device is provided. The electronic device includes a communication interface configured to communicate with a second electronic device; and at least one processor configured to transmit information of a generated event to the second electronic device, receive state information of the second electronic device, compare state information of the first electronic device and the state information of the second electronic device with pre-set state information, and provide the event from the first electronic device on the basis of the comparison result.

In accordance with another aspect of the present disclosure, a second electronic device connected with a first electronic device is provided. The electronic device includes a communication interface configured to communicate with the first electronic device; and at least one processor configured to provide an event, for sensing state information of the second electronic device and compare with pre-set state information, and configured to transmit a message related to the state information and the event to the first electronic device on the basis of the comparison result.

In accordance with another aspect of the present disclosure, a method of operating method in a first electronic device is provided. The method includes operation of receiving, information of an event and state information of the second electronic device from a second electronic device, comparing state information of the first electronic device and the state information of the second electronic device with pre-set state information, and providing the event on the basis of the comparison result.

In accordance with another aspect of the present disclosure, a method of operating a first electronic device is provided. The method includes operations of confirming second state information received from a second electronic device, confirming first state information of the first electronic device, comparing the first state information and the second state information with pre-set state information, and performing a function of the second electronic device by switching to the first electronic device according to the comparison result.

In the aforementioned aspect of the present disclosure, the operation of performing the second electronic device according to the comparison result may be an operation of outputting data, which is output to the second electronic device, by switching to the first electronic device.

In addition, the data may be one of text data, voice data, video data, and audio data received from the first electronic device.

In addition, the operation of performing the function of the second electronic device according to the comparison result may be an operation of outputting data, which is output to the second electronic device, to the first electronic device.

In addition, the method may further include an operation of interworking the first electronic device and the second electronic device through wireless communication.

In addition, the method may further include, after the operation of performing the function information of the second electronic device according to the comparison result, an operation of releasing or deleting a currently performed function of the second electronic device.

In addition, the operation of comparing the first state information and the second state information with the pre-set state information may be an operation of comparing whether motion information of the first electronic device and motion information of the second electronic device conform to reference information for a pre-set motion.

In addition, the second state information may be a signal strength of a wireless communication between the first electronic device and the second electronic device and provided from the second electronic device, and the first state information may be at least one of motion information which is output to the first electronic device, input information of a touch or physical key button, user's bodily action information, and a signal strength of wireless communication between the first electronic device and the second electronic device.

In addition, the operation of comparing the first state information and the second state information with the pre-set state information may be an operation of confirming whether the first state information is sensed if the strength of the wireless communication signal based on the second state information is greater than or equal to a pre-set strength.

In accordance with another aspect of the present disclosure, a method of operating a second electronic device interworking with a first electronic device is provided. The method includes operations of confirming whether data is output from the second electronic device, transmitting state information of the second electronic device to the first electronic device when the data is output, and transmitting at least one piece of data related to the output data to the first electronic device.

In the aforementioned aspect of the present disclosure, the data may be received from the first electronic device.

In addition, the method may further include an operation of confirming whether there is a request for transmitting the data from the first electronic device before the data is transmitted.

In addition, the method may further include operations of comparing state information of the second electronic device with pre-set information, and transmitting the data to the first electronic device according to the comparison result.

In accordance with another aspect of the present disclosure, a first electronic device is provided. The electronic device includes at least one processor, wherein the processor confirms second state information received from a second electronic device and thereafter confirms first state information of the first electronic device, compares the first state information and the second state information with pre-set state information, and performs a function of the second electronic device according to the comparison result.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
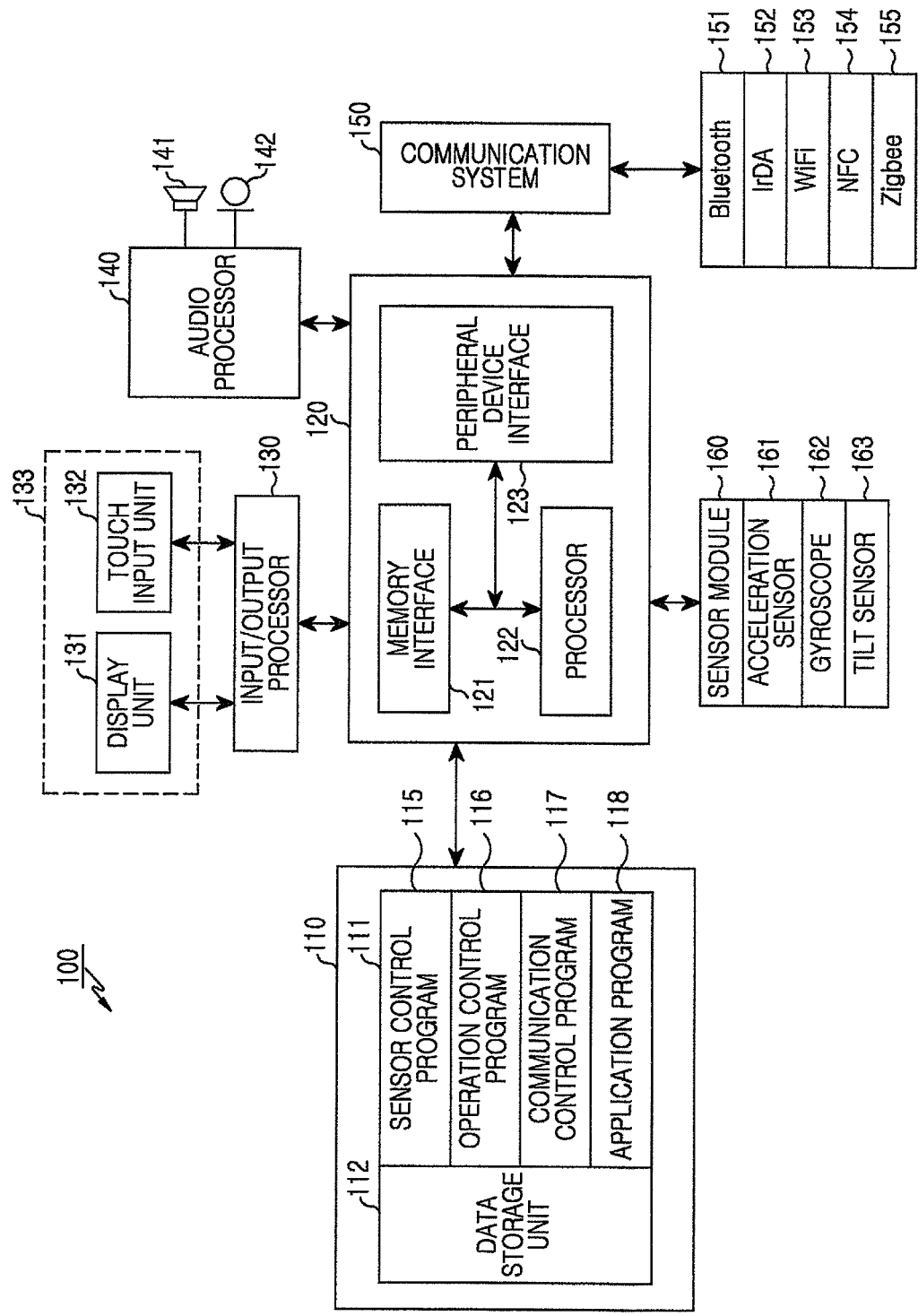
FIG. 1 illustrates a block diagram of a first electronic device according to various example embodiments of the present disclosure.

FIGS. 1 through 6B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Example embodiments of the present disclosure will be described herein below with reference to the accompanying drawings. In the following description, well-known functions or constructions are not described in detail since they would obscure the disclosure in unnecessary detail. Also, the terms used herein are defined according to the functions of the present disclosure. Thus, the terms may vary depending on a user's or operator's intention and usage. That is, the terms used herein may be understood based on the descriptions made herein.

In the description of various example embodiments of the present disclosure, an electronic device may be described by assuming a touch screen capable of performing an input process using an input unit and a display process using a display unit in one physical screen. Although the display unit and the input unit are separately illustrated in the structure of the device in the present disclosure, it is also possible that the display unit includes the input unit, or the input unit is represented by the display unit.

Of course, the present disclosure is not limited only to the electronic device including the touch screen. Rather, the present disclosure may also apply to embodiment where the display unit and the input unit are physically separated or apply to various electronic devices including only one of the display unit and the input unit.

Hereinafter, in various example embodiments, the device having the touch screen is an electronic device including a display unit, wherein the display unit may be a touch screen including a touch input unit and a display unit, a display unit not including a touch input unit, a display unit including an input unit, and the like.

A first electronic device or a second electronic device according to the present disclosure may be one or more combinations of various devices such as a mobile communication terminal, a Personal Digital Assistant (PDA), a Personal Computer (PC), a smart phone, a smart Television (TV), a netbook computer, a Mobile Internet Device (MID), a Ultra Mobile Personal Computer (UMPC), a tablet PC, a mobile pad, a media player, a handheld computer, a Motion Picture Experts Group Layer 3 (MP3) player, a video phone, an e-book reader, a Portable Multimedia Player (PMP), a mobile medical device, an electronic accessory, an electronic appcessory, a camera, a wearable device, a smart watch (or smart clock), an electronic clock, a wrist watch, a refrigerator, an air conditioner, a cleaner, an artificial intelligent robot, an oven, a microwave oven, a washing machine, an electronic bracelet, an electronic necklace, an air purifier, an electronic picture frame, a set-top box, a TV box (e.g., Samsung HomeSync™, Apple TV™, or Google TV™), an electronic dictionary, a car infotainment device, an electronic equipment for ship (e.g., a vessel navigation device, a gyro compass, and the like), avionics, a security device, an electronic costume, an electronic key, a camcorder, game consoles, various medical devices (e.g., Magnetic Resonance Angiography (MRA), Magnetic Resonance Imaging (MRI), Computed Tomography (CT), imaging equipment, ultrasonic instrument, and the like), a TV, a Digital Video Disk (DVD) player, a navigation device, a Global Positioning System (GPS), an Event Data Recorder (EDR), a Flight Data Recorder (FDR), a Head-Mounted Display (HMD), a flat panel display device, an electronic album, a furniture or a part of building/constructions including the electronic device, an electronic board, an electronic signature receiving device, a projector, and the like. It is apparent to those ordinarily skilled in the art that the electronic device according to the present disclosure is not limited to the aforementioned devices.

When a component is mentioned as being "connected" to or "accessing" another component, this may mean that it is directly connected to or accessing the other component, but it is to be understood that there are no intervening components present. Alternatively, when a component is mentioned as being "directly connected" to or "directly accessing" another component, it is to be understood that there are no intervening components present.

FIG. 1 illustrates a block diagram of a first electronic device according to various example embodiments of the present disclosure.

Referring to FIG. 1, a first electronic device 100 includes a memory 110 and a processor unit 120. A peripheral device may include an input/output processor 130, an input/output unit 133 including a display unit 131 and a touch input unit 132, an audio processor 140, a communication system 150, and other peripheral devices.

Each constitutional element is described as follows.

The memory 110 includes a program storage unit 111 for storing a program for controlling an operation of the first electronic device 100 and a data storage unit 112 for storing data generated during the program is executed. Data generated by the program may be stored by the operation of the processor 122.

When the first electronic device 100 processes data of the program, the data storage unit 112 may store a program function, a program purpose, a keyword, an IDentification (ID) code, and information regarding peripheral devices of the first electronic device 100 and usable by the program.

The program storage unit 111 may include a sensor control program 115, an operation control program 116, a communication control program 117, and at least one application program 118. The programs included in the program storage unit 111 may consist of a group of instructions and thus may be expressed in an instruction set.

The sensor control program 115 may process to sense a state of the first electronic device 100 by using one or more sensors included in a sensor module 160, and may process to determine a combined motion of the first electronic device 100 by using the sensing information.

The sensor control program 115 may provide control to determine the combined motion of the first electronic device 100 from the sensing information received from the first electronic device 100, and may process to determine whether the combined motion corresponding to the sensing information of a second electronic device 300, which is received from the first electronic device 100 and the second electronic device 300, satisfies a control condition for controlling the first electronic device 100.

The operation control program 116 may determine control information including an instruction capable of controlling the first electronic device 100, and may control the first electronic device 100 to operate according to the instruction included in the control information.

The communication control program 117 may include at least one software constitutional element for controlling communication with at least one peer electronic device by using the communication system 150.

The communication control program 117 may search for the peer electronic device for a communication connection. If the peer electronic device for the communication connection is found, the communication control program 117 may establish a connection for communication with the peer electronic device. The communication control program 117 may perform a capability search and session establishment procedure with respect to the connected peer electronic device to provide a control of data transmission/reception with respect to the peer electronic device via the communication system 150.

The application program 118 may include a software constitutional element for at least one application installed in the memory 110 of the first electronic device 100.

The memory 110 included in the first electronic device 100 may consist of one or more units. According to one example embodiment, on the basis of a usage, the memory 110 may function only as the program storage unit 111, may function only as the data storage unit 112, or may function as both of the two. According to a feature of the first electronic device 100, a physical area inside the memory 110 may not be clearly divided.

The processor unit 120 may include a memory interface 121, at least one processor 122, and a peripheral device interface 123. Herein, the memory interface 121, at least one processor 122, and peripheral device interface 123 included in the processor unit 120 may be integrated in at least one circuit or may be implemented as separate constitutional elements.

The memory interface 121 may control an access to the memory 110 of a constitutional element such as the processor 122 or the peripheral device interface 123.

The peripheral device interface 123 may control a connection of the processor 122 and the memory interface 121 with respect to an input/output peripheral device of the first electronic device 100.

The processor 122 may control the first electronic device 100 to provide various multimedia services by using at least one software program, may control the display unit 131 to perform a display operation to confirm a User Interface (UI) operation of the first electronic device 100 via the input/output processor 130, and may control the touch input unit 132 to provide a service for receiving an instruction input from an external device of the first electronic device 100. In this embodiment, the processor 122 may execute at least one program stored in the memory 110 to provide a service corresponding to the program.

The input/output processor 130 may provide an interface between the peripheral device interface 123 and the input/output unit 133 such as the display unit 131 and the touch input unit 132.

The display unit 131 may constitute a UI operation by receiving state information of the first electronic device 100, a character which is input from the external device, a moving image, or a still image from the processor unit 120 and may display it via the input/output processor 130.

The touch input unit 132 may provide input data generated by a user's selection to the processor unit 120 via the input/output processor 130.

According to one example embodiment, the touch input unit 132 may consist of only a control button to receive data for the control from an external element of the first electronic device 100, or may consist of a keypad.

In addition, the touch input unit 132 may be included in the display unit 131 such as a touch screen in which an input and an output can be generated simultaneously. In this embodiment, the touch input unit 132 used in the touch screen may use one or more of a capacitive type, a resistance (or pressure sensitive) type, an infrared type, an electro inductive type, and an ultrasonic type.

According to one example embodiment, in addition to a direct touch input mechanism, the touch screen may use an input mechanism of inputting an instruction when an input object is located within a specific distance from the touch screen. Terms such as a hovering or floating touch, an indirect touch, a proximity touch, a non-contact input, and the like, may be used.

The input/output device 133 is a device in which the touch input unit 132 is coupled on the display unit 131, and may be a touch screen capable of inputting an instruction by touching a screen configuration displayed in the display unit 131 in the operation of the first electronic device 100.

Since the touch screen may perform both a role of the display unit 131 for displaying the UI operation of the first electronic device 100 and a role of the touch input unit 132 for inputting an external instruction to the first electronic device 100, in the following description, the touch screen 133 may be configured by including the display unit 131 and the touch input unit 132.

The audio processor 140 may provide an audio interface between a user and the first electronic device 100 via a speaker 141 and a microphone 142.

The communication system 150 may perform a communication function. The communication system 150 may perform communication with a peer electronic device, i.e., the first electronic device 100, by using at least any one of mobile communication via a base station, wireless communication (e.g., infrared communication (IrDA), Bluetooth, Bluetooth Low Energy (BLE), Wi-Fi, Near Field Communication (NFC), ZigBee), wireless Local Area Network (LAN) communication, and wired communication.

The second electronic device 300 may be constructed with the same or similar electronic device as to the electronic device of FIG. 1. Hereinafter, various example embodiments may be described by taking a smart watch wearable on a wrist and a smart phone interworking with the smart watch for a representative example. Herein, the smart phone may be the first electronic device 100, and the smart watch may be the second electronic device 300. The first electronic device 100 and the second electronic device 300 may not be limited to the smart watch or the smart phone.

A gesture or a motion may be used as one example embodiment for inputting an input to the first electronic device 100 or the second electronic device 300.

The gesture may be defined as a mechanism for inputting an instruction by touching the touch screen 133 of the first electronic device 100 or the second electronic device 300 by an input means, for inputting an instruction by performing a hovering operation on the input means at a position spaced apart by a specific distance from the touch screen 133, for grabbing a sensor capable of sensing a pressure with a strength greater than or equal to a specific level, or for inputting an instruction by manipulating a button attached to the first electronic device 100 or the second electronic device 300. According to one example embodiment, it may be defined that the touch includes one touch, two touches, three touches, a touch maintained for a time greater than or equal to a specific time, a drag occurring during the touch is maintained, and a touch release operation.

The motion may be defined as an action of shaking (vibrating), moving, or rotating the first electronic device 100 or the second electronic device 300 or an action of expressing a specific geometric shape by using the aforementioned method. The first electronic device 100 may acquire information regarding a motion (e.g., a location change, an acceleration change, and a rotational inertia change) of the first electronic device 100 in accordance with a 3 Dimensional (3D) coordinate with respect to the aforementioned actions.

The first electronic device 100 or the second electronic device 300 may input an instruction through a gesture, or may input an instruction through a motion, or may input an instruction by combining the gesture and the motion. A 'combined motion' may be defined as an operation of inputting an instruction by using the aforementioned various methods.

The first electronic device 100 or the second electronic device 300 may use the processor to directly perform an operation performed by the aforementioned one or more programs.

Figure 2A:
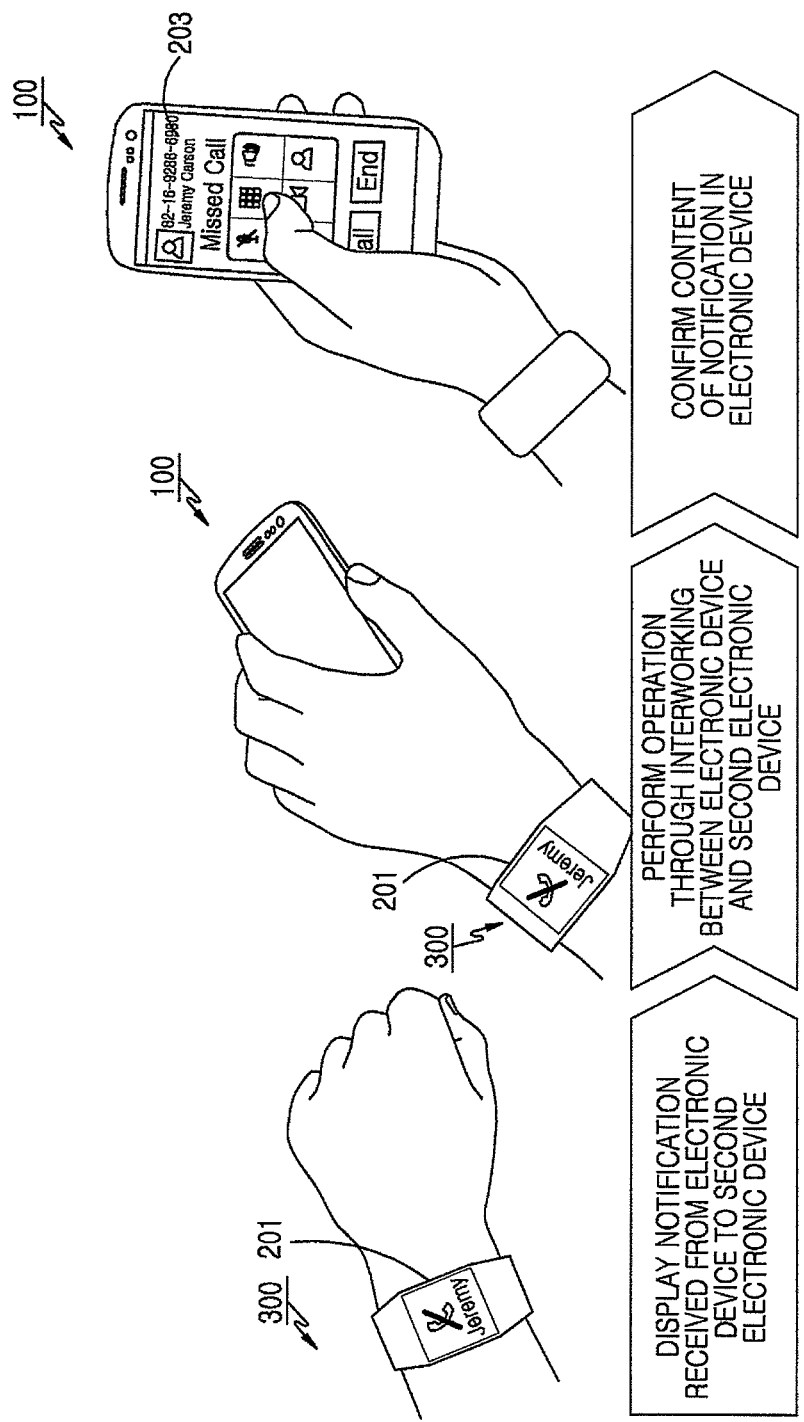
FIG. 2A to FIG. 2C illustrate an interworking operation of a first electronic device and a second electronic device according to one example embodiment of FIG. 1.
Figure 2B:
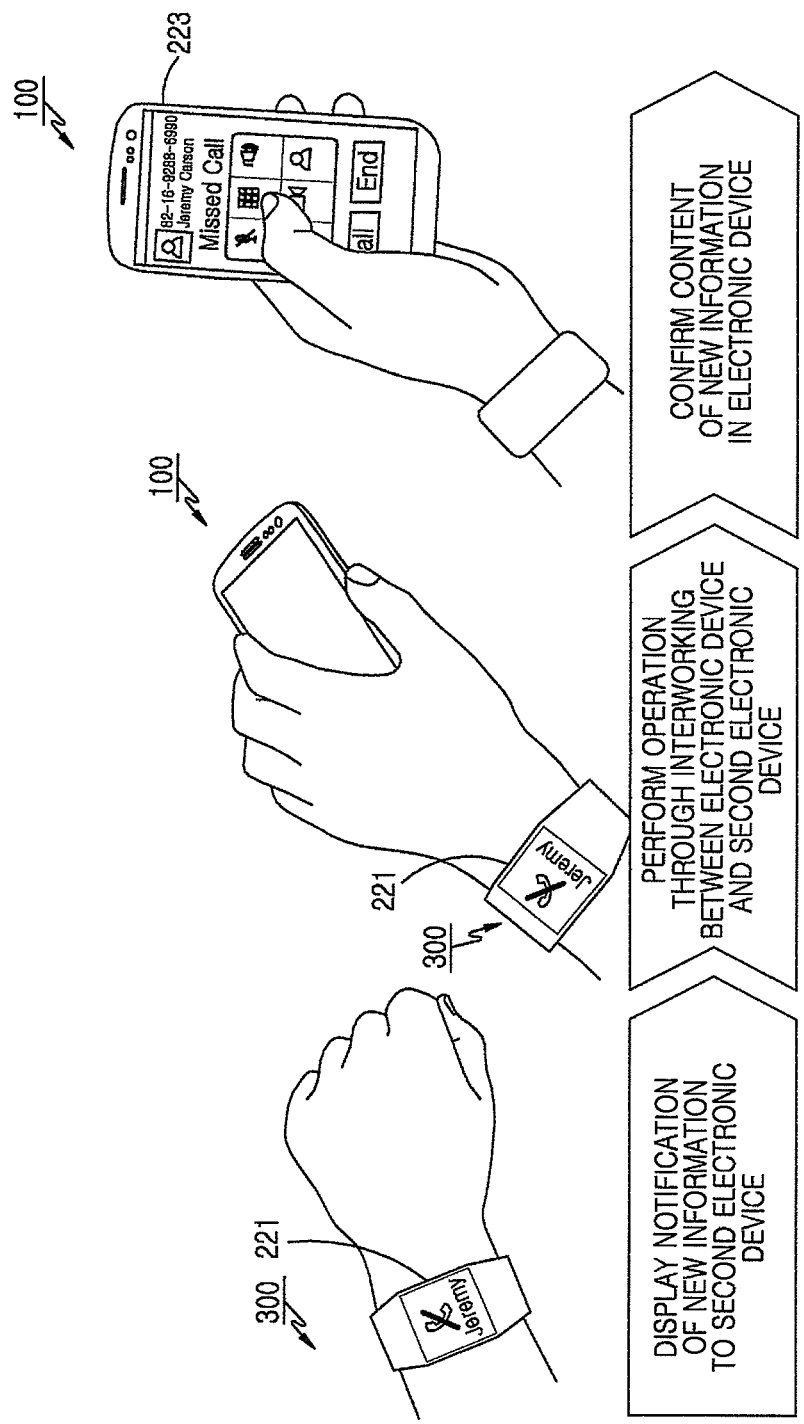
Figure 2C:
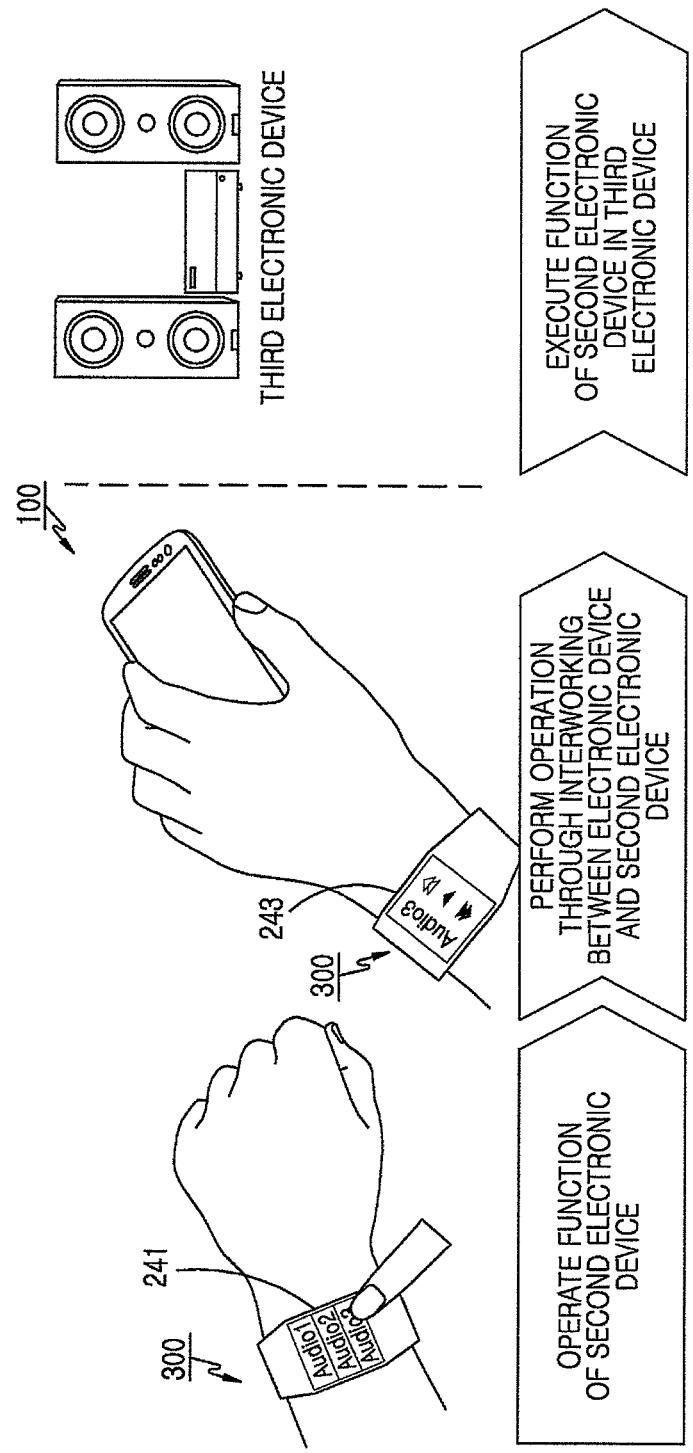

FIG. 2A to FIG. 2C illustrate an interworking operation of a first electronic device and a second electronic device according to one example embodiment of FIG. 1.

Referring to FIG. 2A, the first electronic device 100 may transmit to the second electronic device 300 a notification for received new data. The second electronic device 300 may display to the display unit the notification received from the first electronic device 100. The first electronic device 100 and the second electronic device 300 may perform an operation by interworking with each other. If such an operation conforms to pre-set information, the first electronic device 100 may execute newly received data or may perform an operation related to the newly received data.

According to various example embodiments, information regarding the operation of the first electronic device 100 may be confirmed after the first electronic device 100 receives information regarding the operation of the second electronic device 300. According to one example embodiment, the information regarding the operation of the first electronic device 100 and the information regarding the operation of the second electronic device 300 are compared to determine whether the compared information pieces conform to the pre-set information. If the comparison result shows that the compared information pieces confirm to the pre-set information, data which is output from the second electronic device 300 or at least one piece of data related to the data may be output via the first electronic device 100.

According to various example embodiments, the first electronic device 100 may generate a missed call event at a call connection request received from Jeremy, and may display a notification regarding the missed call of Jeremy to the display unit of the second electronic device 300 (see 201 in the figure).

An operation in which the first electronic device 100 displays the notification of the missed call event of Jeremy to the display unit of the second electronic device 300 may be an operation in which the first electronic device 100 transmits notification information regarding the generated missed call to the second electronic device 300, and the second electronic device 300 displays the notification information regarding the received missed call to the display unit.

According to one example embodiment, the first electronic device 100 may provide control such that data received from the first electronic device 100 is displayed in the display unit of the second electronic unit by directly transmitting the data to the second electronic device 300.

The following descriptions may also be applied to various example embodiments.

The first electronic device 100 and the second electronic device 300 may sense a pre-set operation (or a combined motion) generated by a user. For example, in order to confirm data (i.e., notification information or actual data) displayed in the second electronic device via the first electronic device 100, if the user checks for the display unit by raising the first electronic device 100 with a hand on which the second electronic device 300 is worn, the first electronic device 100 may confirm whether an operation generated in the first electronic device 100 or the second electronic device 300 conforms to a pre-set operation, and if it conforms to the pre-set operation, may automatically display data to the display unit.

According to one example embodiment, if the first electronic device 100 and the second electronic device 300 include sensors capable of sensing a device state, the first electronic device 100 and the second electronic device 300 may acquire at least one piece of state information among motion information such as a movement, a vibration, and a rotation, input information for touching a touch screen or pressing a physical button, gaze processing information via a sensor for sensing a user's bodily action (e.g., a pupil movement) in accordance with the pre-set operation.

The first electronic device 100 may receive sensing information acquired by the second electronic device 300 through network communication, and may determine whether the received sensing information of the second electronic device 300 and the sensing information acquired by the first electronic device 100 satisfy the pre-set information (e.g., a control condition).

The operation of determining whether the first electronic device 100 satisfies the pre-set information may be an operation for determining whether the sensing information of the first electronic device 100 and the sensing information of the second electronic device 300 are included in the pre-set information, or correspond to the same or similar range, or are within a margin of error of a pre-set operation. If it is determined that the sensing information of the first electronic device 100 and the second electronic device 300 satisfies the pre-set information, the first electronic device 100 may provide control to perform the function of the first electronic device 100 according to the pre-set information. Herein, the function of the first electronic device 100 according to the pre-set information may be a function corresponding to a notification for an event newly generated in the first electronic device 100 or an event displayed to the second electronic device 300 and newly received from the first electronic device 100. If the sensing information of the first electronic device 100 and the second electronic device 300 satisfies the control condition, the first electronic device 100 may display information capable of confirming a detailed content on a missed call to the display unit 131 of the first electronic device 100 (see 203 in the figure).

According to one example embodiment, when the detailed content of the missed call is displayed to the display unit of the first electronic device 100, the first electronic device 100 may provide control to release notification information for the missed call event of the first electronic device 100, which is displayed to the display unit of the second electronic device 300, or to delete notification data for the missed call event. According to one example embodiment, the first electronic device 100 may directly release the notification displayed to the display unit of the second electronic device 300, or may directly delete the notification data. According to one example embodiment, the first electronic device 100 may transmit data including an instruction for allowing the second electronic device 300 to release the display of the notification information displayed to the display unit or to delete the notification data. Therefore, the second electronic device 300 may release or completely delete the notification information displayed to the display unit by the instruction included in the received data. The following description may also equally apply to various example embodiments.

According to one example embodiment, if a lock function is enabled in the first electronic device 100, a gesture or action of the first electronic device 100 and the second electronic device 300 is performed to allow the first electronic device 100 to release the lock function when sensing information satisfies a control condition. The second electronic device 300 may take a key role of releasing the lock function of the first electronic device 100. The following description may also equally apply to various example embodiments.

According to various example embodiments, the first electronic device 100 may receive the call connection request from Jeremy, and may display a notification on the call connection request of Jeremy to the display unit of the second electronic device 300 (see 201 in the figure).

The first electronic device 100 and the second electronic device 300 may perform the pre-set operation, and may acquire sensing information corresponding to the operation. According to one example embodiment, the first electronic device 100 and the second electronic device 300 may acquire sensing information of the first electronic device 100 or the second electronic device 300 in accordance with an operation of confirming the display unit of the second electronic device 300 by raising a left wrist to confirm the second electronic device 300 worn on the left wrist by a user and an operation of bringing the first electronic device 100 in contact with an ear as if having a phone conversation in a state of grabbing the first electronic device 100.

If the first electronic device 100 and the second electronic device 300 include sensors capable of sensing a device state, the first electronic device 100 and the second electronic device 300 may acquire a motion change such as a movement, vibration, rotation, and the like, of the first electronic device 100 and the second electronic device 300, a touch on a touch screen or a gesture for pressing a button, or gaze processing information via a sensor for sensing a user's bodily action (or a pupil movement) in accordance with the pre-set operation.

The first electronic device 100 may receive sensing information of the second electronic device 300, which is acquired through network communication, from the second electronic device 300, and may determine whether the received sensing information of the second electronic device 300 and the sensing information acquired from the first electronic device 100 satisfies a control condition.

The operation of determining whether the first electronic device 100 satisfies the control condition may be an operation of determining whether the sensing information of the first electronic device 100 and the sensing information of the second electronic device 300 are included in the control condition, or correspond to the same or similar range, or are within a margin of error of the pre-set operation.

If the sensing information of the first electronic device 100 and the sensing information of the second electronic device 300 satisfy the control condition, the first electronic device 100 may accept the call connection request received from Jeremy.

According to one example embodiment, if the call connection request received from Jeremy is accepted or if the call connection request is rejected or if the call ends after the call connection, the first electronic device 100 may provide control to release the display of notification information for the call connection request of the first electronic device 100, which is displayed to the display unit of the second electronic device 300, or to delete notification data for a missed call event.

According to various example embodiments, the first electronic device 100 may output an alarm according to an alarm event, may display alarm information based on the alarm event which is output from the first electronic device 100 via the second electronic device 300, or may provide control to output the same alarm as the alarm which is output from the first electronic device 100.

If a pre-set operation performed by the first electronic device 100 and the second electronic device 300 satisfies a control condition, the first electronic device 100 may release an alarm output operation, and may control the second electronic device 300 to release the alarm output operation. If the lock function is enabled in the first electronic device 100, the second electronic device 300 may control the first electronic device 100 to take a key role of releasing the lock function, and the first electronic device 100 may release the lock function.

Herein, an operation which is pre-set through sensing information acquired from the first electronic device 100 and the second electronic device 300 may be a combined motion of the first electronic device 100 or the second electronic device 300. The pre-set operation may be an operation in which an instruction received by the first electronic device 100 from the second electronic device 300 is performed in the first electronic device 100, or may be a control condition for controlling the first electronic device 100 to process notification information transmitted by the first electronic device 100 to the second electronic device 300, and may be stored in the memory of the first electronic device 100 and the memory of the second electronic device 300. In addition, the first electronic device 100 and the second electronic device 300 may include control information to be agreed with each other. The first electronic device 100 or the second electronic device 300 may acquire information such as a 3D coordinate, tilt, vibration, movement direction, and the like, of the first electronic device 100 or the second electronic device 300 by using sensors such as an acceleration sensor 161, a tilt sensor 163, a gyroscope 162, a GPS (not shown), and a light sensor (not shown). The sensors used when the first electronic device 100 or the second electronic device 300 acquires the sensing information such as the 3D coordinate, the tile, the vibration, the movement direction, and the like, are not limited to such sensors as the acceleration sensor, the tilt sensor, the gyroscope, the GPS, the light sensor, and the like, and thus various sensors such as a pupil (or gaze) detection sensor or a brainwave detection sensor, and the like, capable of acquiring information regarding a state of the first electronic device 100 or the second electronic device 300 may also be used.

The first electronic device 100 or the second electronic device 300 may compare sensing information acquired by using the sensors. The comparison may be an operation of determining whether a combined motion of the first electronic device 100 or the second electronic device 300 is included in the same or similar range of a control condition. The same may also apply not only to the aforementioned example embodiments of FIG. 2A but also to various example embodiments described below.

When determining a control condition for controlling the first electronic device 100 and the second electronic device 300 and a pre-set operation for satisfying the control condition, sensing information may not be limited to state information of the first electronic device 100, which is acquired by sensors included in the first electronic device 100, or state information of the second electronic device 300, which is acquired from sensors included in the second electronic device 300.

As another example of the pre-set operation performed by the first electronic device 100 and/or the second electronic device 300, the first electronic device 100 may additionally have a change in a signal strength of wireless communication connected to the first electronic device 100 and the second electronic device 300 may be additionally included in the first electronic device 100.

When two devices are connected through Bluetooth communication, IrDA infrared communication, Wi-Fi communication, NFC communication, ZigBee communication, and the like, the first electronic device 100 or the second electronic device 300 may confirm that the signal strength of the connected wireless communication is increased if an operation is performed in which the second electronic device 300 accesses the first electronic device 100. It may be confirmed that an operation is performed in which the first electronic device 100 and the second electronic device 300 continuously become closer in distance, and thus the signal strength of wireless communication becomes greater than or equal to a pre-set signal strength. It may be determined that a distance between the first electronic device 100 and the second electronic device 300 is within a pre-set distance range.

According to various example embodiments, when the first electronic device 100 and the second electronic device 300 are connected through Bluetooth communication, it may be confirmed that the signal strength of Bluetooth communication connected between the aforementioned two devices becomes strong if an operation is performed in which the first electronic device 100 and the second electronic device 300 become closer in distance. The first electronic device 100 may confirm that the signal strength of Bluetooth communication is greater than or equal to the pre-set signal strength, and may determine that a distance between the first electronic device 100 and the second electronic device 300 is within a range of a pre-set distance (i.e., a distance between the second electronic device worn on a user's wrist and the first electronic device grabbed by a hand).

The first electronic device 100 may measure the signal strength of Bluetooth communication connected to the second electronic device 300, and if it is greater than or equal to the pre-set signal strength, may determine that the two devices are located within a pre-set distance. The first electronic device 100 may release an output alarm, and may be controlled to release the alarm which is currently output to the second electronic device 300.

The followings are described with reference to FIG. 2B.

The second electronic device 300 may display a notification for an event received through network communication or an operation executed in the second electronic device 300 in the display unit. The first electronic device 100 and the second electronic device 300 may interwork to perform an operation. If the performed operation conforms to pre-set information, an event newly received by the second electronic device 300 may be executed in the first electronic device 100 or a function operated in the second electronic device 300 may be performed in the first electronic device 100.

According to various example embodiments, the second electronic device 300 may select a phone number of a target (e.g., a phone number of Joseph) to which a call connection request is to be made from an address book stored in the memory 110 of the second electronic device 300, and may display contact information including the selected phone number of Joseph to the display unit.

Alternatively, the phone number may be directly input without using the number stored in the address book in the calling function of the second electronic device 300, and the input phone number (it is assumed to be the phone number of Joseph) may be displayed to the display unit.

Alternatively, the second electronic device 300 may display notification information regarding a missed call event generated from a plurality of targets (e.g., Jeremy and Joseph) to the display unit through network communication. The second electronic device 300 may select notification information (i.e., select Joseph between Jeremy and Joseph) for a missed call event which intends to request a call connection from the notification for a plurality of missed call events and may display the selected information to the display unit.

The first electronic device 100 and the second electronic device 300 may perform a pre-set operation to satisfy a control condition. According to one example embodiment, when a gesture and motion for grabbing the first electronic device 100 by a left hand in a state where the second electronic device 300 is wore on a left wrist of a user, the first electronic device 100 and the second electronic device 300 may measure a network communication signal between the aforementioned two devices through network communication. When the aforementioned two electronic devices become close in distance due to the operation of grabbing the second electronic device 300, it may be determined whether network communication signal strength is greater than or equal to a pre-set specific strength. If the network communication signal strength with the second electronic device 300 is greater than or equal to the pre-set strength, the first electronic device 100 may determine that the control condition is satisfied.

If the control condition is satisfied, the second electronic device 300 may transmit Joseph's phone number information displayed to the display unit of the first electronic device 100, instruction information for controlling to request a call connection by including the Joseph's call number, or information on a directly input number to the first electronic device 100. The first electronic device 100 may request a call connection to Joseph according to received information.

According to one example embodiment, if a call connection is requested to Joseph via the first electronic device 100, the second electronic device 300 may release the display of a notification regarding a missed call of Joseph and displayed in the display unit or contact information of Joseph and displayed in the display unit by selecting it from an address book.

According to various example embodiments, the second electronic device 300 may receive Social Network Service (SNS) data, and may display the content of the received SNS or notification information regarding the received SNS to the display unit (see 221 in the figure). The SNS data received by the second electronic device may include a phone number of an SNS sender, or may include an e-mail address of the SNS sender.

The first electronic device 100 and the second electronic device 300 may perform a pre-set operation to satisfy a control condition. According to one example embodiment, an operation of raising the second electronic device 300 and rotating it such that the display unit is visible (more specifically, an operation of raising a wrist on which the second electronic device is worn and of rotating the wrist such that the display unit of the second electronic device is visible) may be performed in a state where the second electronic device 300 is wore on a left wrist of a user, state information of the first electronic device 100 or the second electronic device 300 may be confirmed in accordance with an operation (i.e., gesture or motion) of moving the first electronic device 100 to a location close to a face. The first electronic device 100 and the second electronic device 300 may measure a network communication signal between the aforementioned two devices through network communication, and may determine whether a network communication signal strength is greater than or equal to a pre-set specific strength when the distance between the two electronic devices becomes close due to the operation of grabbing the second electronic device 300. If the network communication signal strength with the second electronic device 300 is greater than or equal to the pre-set strength, the first electronic device 100 may determine whether sensing information of the first electronic device 100 and the second electronic device 300 satisfies the control condition.

If the control condition is satisfied, the second electronic device 300 may request a call connection to a phone number included in received SNS data, or may transmit instruction information (it may be information consisting of only a phone number or e-mail address without including the instruction information) for controlling the first electronic device 100 by executing a program which can create an e-mail by determining an e-mail address included in the SNS data as a recipient. The first electronic device 100 may request a call connection to a phone number included in SNS data according to the received information, or may execute a program which can create an e-mail by determining an e-mail address included in the SNS data as a recipient (see 223 in the figure).

If a pre-set operation of the second electronic device 300 is for notification information of SNS data displayed to the display unit of the second electronic device 300 and satisfies the control condition, the first electronic device 100 may display SNS information in accordance with the notification information of SNS data or may output other information related thereto in association with the SNS information.

According to various example embodiments, the second electronic device 300 may display media data included in the memory to the display unit, and may select one of them and display the selected media data (e.g., audio 3). Alternatively, the second electronic device 300 may play back media data included in the memory 110 by executing an operation of inputting voice to the microphone 142.

The first electronic device 100 and the second electronic device 300 may perform a pre-set operation to satisfy the control condition. According to one example embodiment, the first electronic device 100 and the second electronic device 300 may confirm state information of the first electronic device 100 or the second electronic device 300 in accordance with an operation of continuously shaking the grabbed first electronic device 100 in a state where the second electronic device 300 is worn on a left wrist of a user or in a state where media data (e.g., audio 3) is played back.

The first electronic device 100 and the second electronic device 300 may measure a network communication signal between the aforementioned two devices through network communication, and may determine whether a network communication signal strength is greater than or equal to a pre-set specific strength when the distance between the two electronic devices becomes close due to the operation of grabbing the second electronic device 300. If the network communication signal strength with the second electronic device 300 is greater than or equal to the pre-set strength, the first electronic device 100 may determine whether sensing information of the first electronic device 100 and the second electronic device 300 satisfies the control condition.

If the control condition is satisfied (if the network communication signal strength with the electronic device is greater than or equal to the specific strength), the second electronic device 300 may transmit data including an instruction capable of controlling the first electronic device 100 to play back selected media data (e.g., audio 3). If the control condition is satisfied (if the sensing information of the electronic device satisfies a pre-set operation confirming to the control condition), the first electronic device 100 may control to play back media data (e.g., audio 3) according to received data.

Herein, when the first electronic device 100 plays back media data (e.g., audio 3) transmitted from the second electronic device 300, an instruction included in data received in the second electronic device 300 may be an instruction for controlling to execute the selected media data (e.g., audio 3) from the beginning, or may be an instruction for controlling to resume the playback when transmitted to the electronic device 300 by satisfying the condition in the second electronic device 300.

The electronic device 300 does not limit media data that can be played back in the first electronic device 100 or the second electronic device 300 only to audio data. Thus, the media data may be moving image data or still image data, or may be audio data information, moving image data information, or still image data information that can be played back by receiving through the Internet or from a specific server.

If media data (e.g., audio 3) is played back according to data received from the second electronic device 300, the first electronic device 100 may control to stop the playback of the media data (e.g., audio 3) transmitted from the second electronic device 300.

According to various example embodiments, if the first electronic device 100 and the second electronic device 300 are connected through network communication, a pre-set gesture and motion may be performed via the first electronic device 100 and the second electronic device 300 to allow the first electronic device 100 to perform an operation corresponding to the pre-set gesture and motion.

According to one example embodiment, in a state where the second electronic device 300 is wore on a left wrist of a user, state information of the first electronic device 100 or the second electronic device 300 may be confirmed in accordance with an operation of grabbing the first electronic device 100 by a left hand and preparing for image capturing. The first electronic device 100 may determine whether sensing information of the first electronic device 100 and the second electronic device 300 in accordance with the operation of preparing for the image capturing satisfies control information for executing an image capture program (not shown) of the first electronic device 100.

If the sensing information satisfies the control condition, the first electronic device 100 may execute the image capture program of the first electronic device 100.

The followings are described with reference to FIG. 2C.

The second electronic device 300 may display a performed operation to the display unit. The first electronic device 100 and the second electronic device 300 may interwork to perform the operation. If the perform operation conforms to pre-set information, the second electronic device 300 may provide such that the operation being performed in the second electronic device 300 can be continuously performed in a third electronic device via the first electronic device 100.

According to various example embodiments, the second electronic device 300 may display media data included in the memory to the display unit, and may select one of them and display the selected media data (e.g., audio 3). Alternatively, the second electronic device 300 may play back media data included in the memory 110 by executing an operation of inputting voice to the microphone 142 (see 241 in the figure).

The first electronic device 100 and the second electronic device 300 may perform a pre-set operation to satisfy the control condition. According to one example embodiment, the first electronic device 100 and the second electronic device 300 may confirm state information of the first electronic device 100 or the second electronic device 300 in accordance with an operation of continuously moving the grabbed first electronic device 100 to a location close to the third electronic device in a state where the second electronic device 300 is worn on a left wrist of a user or in a state where media data (e.g., audio 3) is played back.

The first electronic device 100 and the second electronic device 300 may measure a network communication signal between the aforementioned two devices through network communication, and may determine whether a network communication signal strength is greater than or equal to a pre-set specific strength when the distance between the two electronic devices becomes close due to the operation of grabbing the second electronic device 300. If the network communication signal strength with the second electronic device 300 is greater than or equal to the pre-set strength, the first electronic device 100 may determine whether sensing information of the first electronic device 100 and the second electronic device 300 satisfies the control condition.

If the control condition is satisfied (if the network communication signal strength with the electronic device is greater than or equal to the specific strength), the second electronic device 300 may transmit data including an instruction capable of controlling the first electronic device 100 to play back selected media data (e.g., audio 3).

If the control condition is satisfied (if the sensing information of the electronic device satisfies a pre-set operation confirming to the control condition), the first electronic device 100 may transmit data including an instruction capable of controlling to play back media data (e.g., audio 3) in the third electronic device according to received data.

If a control condition for the second electronic device 300 is satisfied (i.e., if the network communication signal strength with the second electronic device is greater than or equal to the specific strength), the third electronic device may control the second electronic device 300 to play back media data (e.g., audio 3) according to received data.

Herein, the second electronic device 300 and the third electronic device may measure a network communication signal between the aforementioned two devices through network communication as described above, and may determine whether the network communication signal strength between the aforementioned two devices is greater than or equal to the pre-set strength by an operation of moving the second electronic device 300 to a location close to the third electronic device.

When the third electronic device receives media data (e.g., audio 3) transmitted from the second electronic device 300 and plays back the media data in the second electronic device 300, an instruction included in data received in the second electronic device 300 may be an instruction for controlling to execute the selected media data (e.g., audio 3) from the beginning, or may be an instruction for controlling to resume the playback when transmitted to the first electronic device 100 by satisfying the condition in the second electronic device 300.

The electronic device 300 does not limit media data that can be played back in the second electronic device 300 only to audio data. Thus, the media data may be moving image data or still image data, or may be audio data information, moving image data information, or still image data information that can be played back by receiving through the Internet or from a specific server.

The first electronic device 100 may control to stop the playback of media data (i.e., audio 3) transmitted from the second electronic device 300 if the third electronic device allows to play back the media data (i.e., audio 3) according to data received from the second electronic device 300.

Figure 3A:
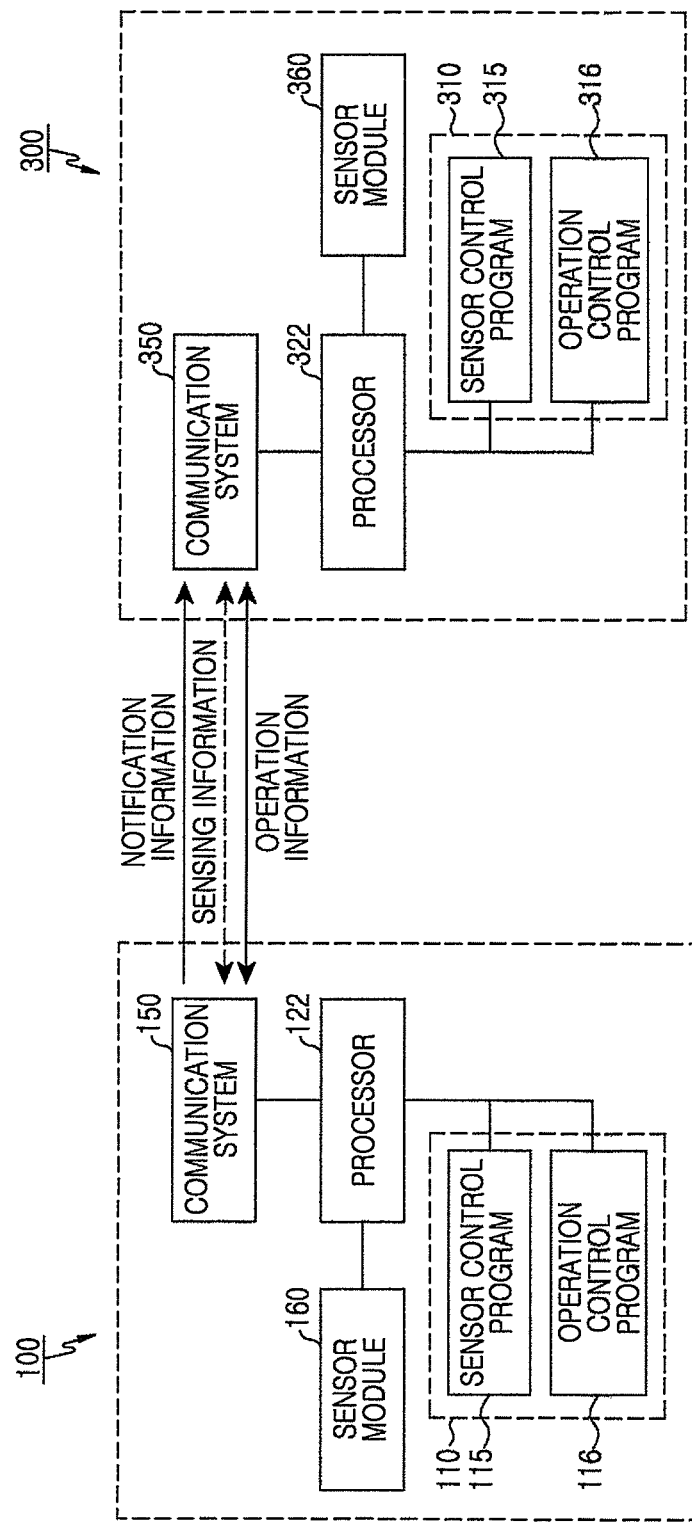
FIG. 3A and FIG. 3B illustrate a data processing operation of a first electronic device and a second electronic device according to one example embodiment of FIG. 1.
Figure 3B:
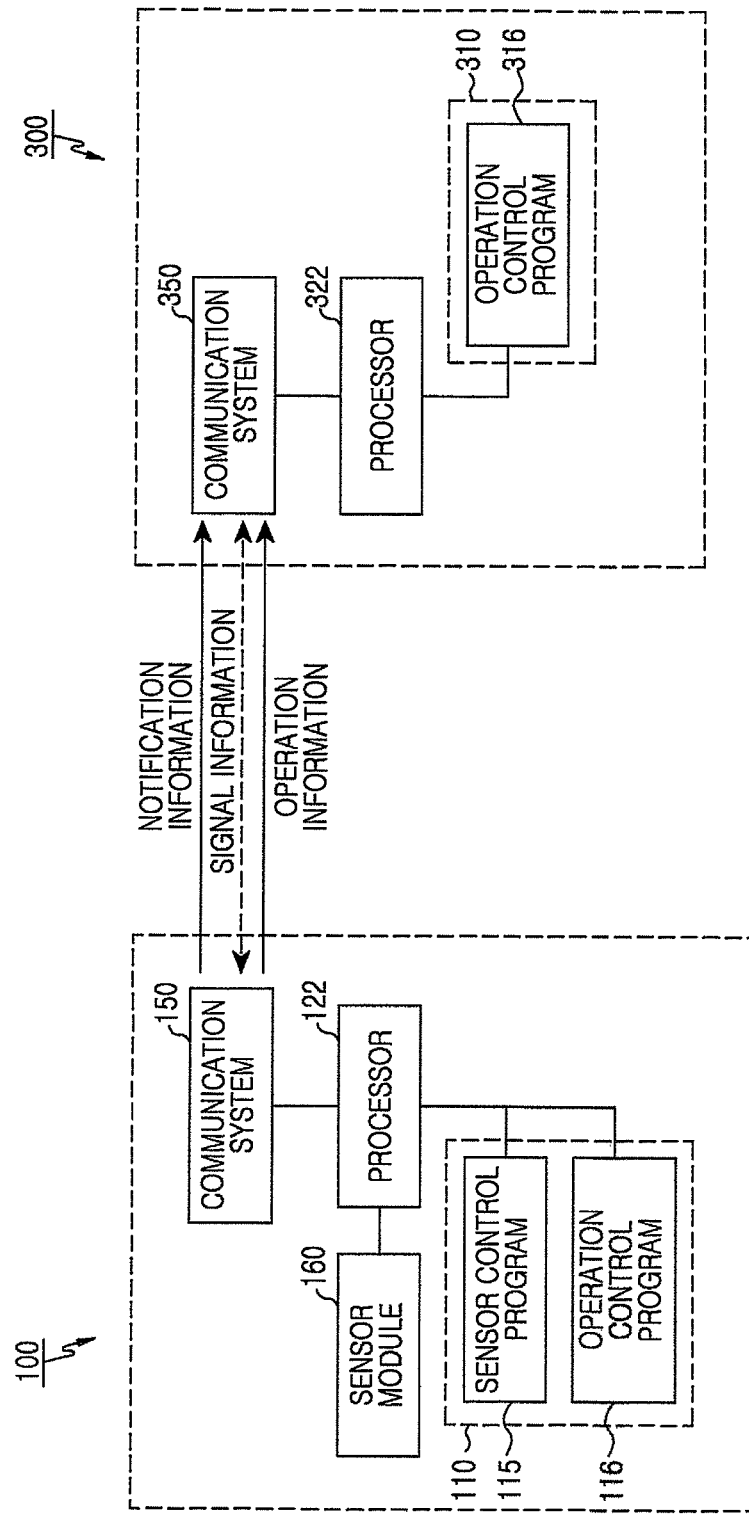

FIG. 3A and FIG. 3B illustrate a data processing operation of a first electronic device and a second electronic device according to one example embodiment of FIG. 1.

The followings are described with reference to FIG. 3A.

A processor 122 of a first electronic device 100 may receive operation control information from a second electronic device 300 via an operation control program 116, and if a control condition is satisfied, may determine to process the operation control information in the first electronic device 100, and may control the first electronic device 100 to operate according to an instruction included in the operation control information received from the second electronic device 300. The processor 122 of the first electronic device 100 may be controlled to operate a sensor module 160 by using a sensor control program 115. The processor 122 of the first electronic device 100 may control to determine a combined motion of the first electronic device 100 and the second electronic device 300 by using sensing information received from the second electronic device 300 according to the sensor control program 115 and sensing information measured by the sensor module 160, and may control to determine whether the combined motion corresponding to the sensing information of the first electronic device 100 or the second electronic device 300 satisfies a control condition for controlling the first electronic device 100.

The processor 122 of the first electronic device 100 may control to transmit notification message (or notification information) of new information received by the first electronic device 100 to the second electronic device 300 via a communication system 150, may control to transmit and receive sensing information with the second electronic device 300, and may control to receive operation control information of the first electronic device 100 from the second electronic device 300.

A processor 322 of the second electronic device 300 may control to sense a state of the second electronic device 300 by using one or more sensors included in a sensor module 360 by using a sensor control program 315, and may control to determine the combined motion of the second electronic device 300 by using the sensing information.

The processor 322 of the second electronic device 300 may control to transmit sensing information to the first electronic device 100 via a communication system 350, and may control to transmit control information capable of controlling the first electronic device 100 to the first electronic device 100.

According to various example embodiments, the first electronic device 100 may receive message data including image data from Joseph through network communication. The first electronic device 100 may transmit notification information regarding the received message data and image data to the second electronic device 300. The second electronic device 300 may display the message data and image data to a display unit of the second electronic device 300 according to received information.

According to one example embodiment, the first electronic device 100 and the second electronic device 300 may confirm state information of the first electronic device 100 or the second electronic device 300 in accordance with an operation of raising the second electronic device 300 worn on a left wrist of a user to confirm notification information displayed to the display unit, an operation of grabbing the first electronic device 100 by a left hand to perform the combined motion, and an operation of confirming the content of notification displayed to the display unit 131 of the first electronic device 100.

The second electronic device 300 may acquire sensing information corresponding to an operation of raising a wrist by using sensors and an operation of rotating such that the display unit is directed upward to confirm notification information. The first electronic device 100 and the second electronic device 300 may acquire sensing information of the first electronic device 100 or the second electronic device 300 in accordance with an operation of wearing the second electronic device 300 on the wrist, grabbing the first electronic device 100 such that the display unit thereof is directed upward, and raising the first electronic device 100 upward (i.e., an operation of raising upward the second electronic device worn on the wrist and the electronic device grabbed by the hand).

The first electronic device 100 may receive sensing information from the second electronic device 300, and may determine whether a pre-set control condition is satisfied by referring one or more information pieces corresponding to combined motions from the sensing information of the first electronic device 100 or the second electronic device 300. The combined motions may include a time at which the first electronic device 100 and the second electronic device 300 start a motion, a trace on which the first electronic device 100 and the second electronic device 300 move, a time at which the first electronic device 100 and the second electronic device 300 stop the motion, a moment at which the first electronic device 100 and the second electronic device 300 vibrate, a time during which the first electronic device 100 and the second electronic device 300 vibrate, an operation in which an instruction is input to a touch screen of the first electronic device 100 and the second electronic device 300, and an operation of manipulating a button of the first electronic device 100 and the second electronic device 300. The first electronic device 100 may receive sensing information from the second electronic device 300, and may determine whether the pre-set control condition is satisfied by referring the one or more information pieces corresponding to the combined motions from the aforementioned sensing information of the first electronic device 100 or the second electronic device 300.

If the sensing information corresponding to the operations of the first electronic device 100 and the second electronic device 300 is partially or entirely included in the same or similar range of the pre-set control condition, the first electronic device 100 may display the content of received message data and image data included in the message data to the display unit of the first electronic device 100.

The followings are described with reference to FIG. 3B.

A processor 122 of a first electronic device 100 may control to operate a sensor module 160 by using a sensor control program 115, may control to determine a combined motion of the first electronic device 100 from sensing information measured by the sensor module 160, and may control to determine whether the combined motion corresponding to the sensing information of the first electronic device 100 satisfies a control condition for controlling the first electronic device 100.

The processor 122 of the first electronic device 100 may control the first electronic device 100 to operate according to an instruction included in operation control information received from a second electronic device 300 by using an operation control program 116 or according to an instruction for controlling the first electronic device 100 in association with the control condition.

The processor 122 of the first electronic device 100 may receive a notification message of new information received by the second electronic device 300 via a communication system 150, may confirm network state information of the second electronic device 300, and may receive control information of the first electronic device 100 from the second electronic device 300. According to one example embodiment, the processor 122 of the first electronic device 100 may transmit the notification message of the new information received by the first electronic device 100 from the second electronic device 300 via the communication system 150.

The processors 122 and 322 of the first electronic device 100 and the second electronic device 300 may control to confirm a signal strength of a network communication connected between the aforementioned two devices by using communication control programs (not shown), and may control to determine whether the signal strength is greater than or equal to a pre-set strength.

The processor 322 of the second electronic device 300 may transmit operation information of the second electronic device 300 to the first electronic device 100 via a communication system 350, and may transmit operation control information capable of controlling the first electronic device 100 to the first electronic device 100.

According to various example embodiments, the second electronic device 300 may receive message data from another electronic device other than the first electronic device 100, the Internet, or a specific server, and may perform a pre-set operation via the first electronic device 100 which is not connected through wireless communication with the second electronic device 300. The first electronic device 100 may perform a connection through the wireless communication with the second electronic device 300. The second electronic device 300 may control to output the message data received through the wireless communication to the first electronic device 100.

The first electronic device 100 or the second electronic device 300 may confirm state information of the first electronic device 100 or the second electronic device 300 in association with an operation of raising the second electronic device 300 worn on a left wrist of a user to confirm notification information displayed to a display unit, an operation of grabbing the first electronic device 100 by a left hand to perform the combined motion, and an operation of confirming the content of notification displayed to the display unit of the first electronic device 100.

When the first electronic device 100 and the second electronic device 300 are connectable through Bluetooth communication and an operation is performed in which the first electronic device 100 and the second electronic device 300 become closer in distance, it may be confirmed that the signal strength of Bluetooth communication becomes strong. The first electronic device 100 may confirm that the signal strength of Bluetooth communication is greater than or equal to the pre-set signal strength, and may determine that a distance between the first electronic device 100 and the second electronic device 300 is within a range of a pre-set distance (i.e., a distance between the second electronic device 300 worn on a wrist and the first electronic device 100 grabbed by a hand). If it is determined that the second electronic device 300 is located within a specific distance, the first electronic device 100 may perform pairing with the first electronic device 100. A wireless communication method of the first electronic device 100 and the second electronic device 300 is not limited to Bluetooth communication and one or more directly connectable various types of wireless communication methods (e.g., IrDA, Wi-Fi, NFC, Zigbee) may be used. The second electronic device 300 may transmit to the first electronic device 100, which is connected with wireless communication, control information including an instruction capable of outputting the received message data to the first electronic device 100.

The first electronic device 100 may acquire sensing information of the first electronic device 100 in accordance with an operation of grabbing the first electronic device 100 such that the display unit thereof is directed upward, and raising the first electronic device 100 upward (i.e., an operation of raising upward the second electronic device 300 worn on the wrist and the first electronic device 100 grabbed by the hand).

The first electronic device 100 may determine whether a pre-set control condition is satisfied by referring one or more information pieces corresponding to combined motions from the sensing information of the first electronic device 100. The combined motions may include a time at which the first electronic device 100 starts a motion, a trace on which the first electronic device 100 moves, a time at which the first electronic device 100 stops the motion, a moment at which the first electronic device 100 vibrates, a time during which the first electronic device 100 vibrates, an operation in which an instruction is input to a touch screen of the first electronic device 100, and an operation of manipulating a button of the first electronic device 100.

If the sensing information corresponding to the operations is partially or entirely included in the same or similar range of the pre-set control condition, the first electronic device 100 may perform an instruction based on data received from the second electronic device 300. If the sensing information acquired by the sensors satisfies the control condition, the first electronic device 100 may control to display the content of message data received from the second electronic device 300 to the display unit 131 of the first electronic device 100.

Figure 4:
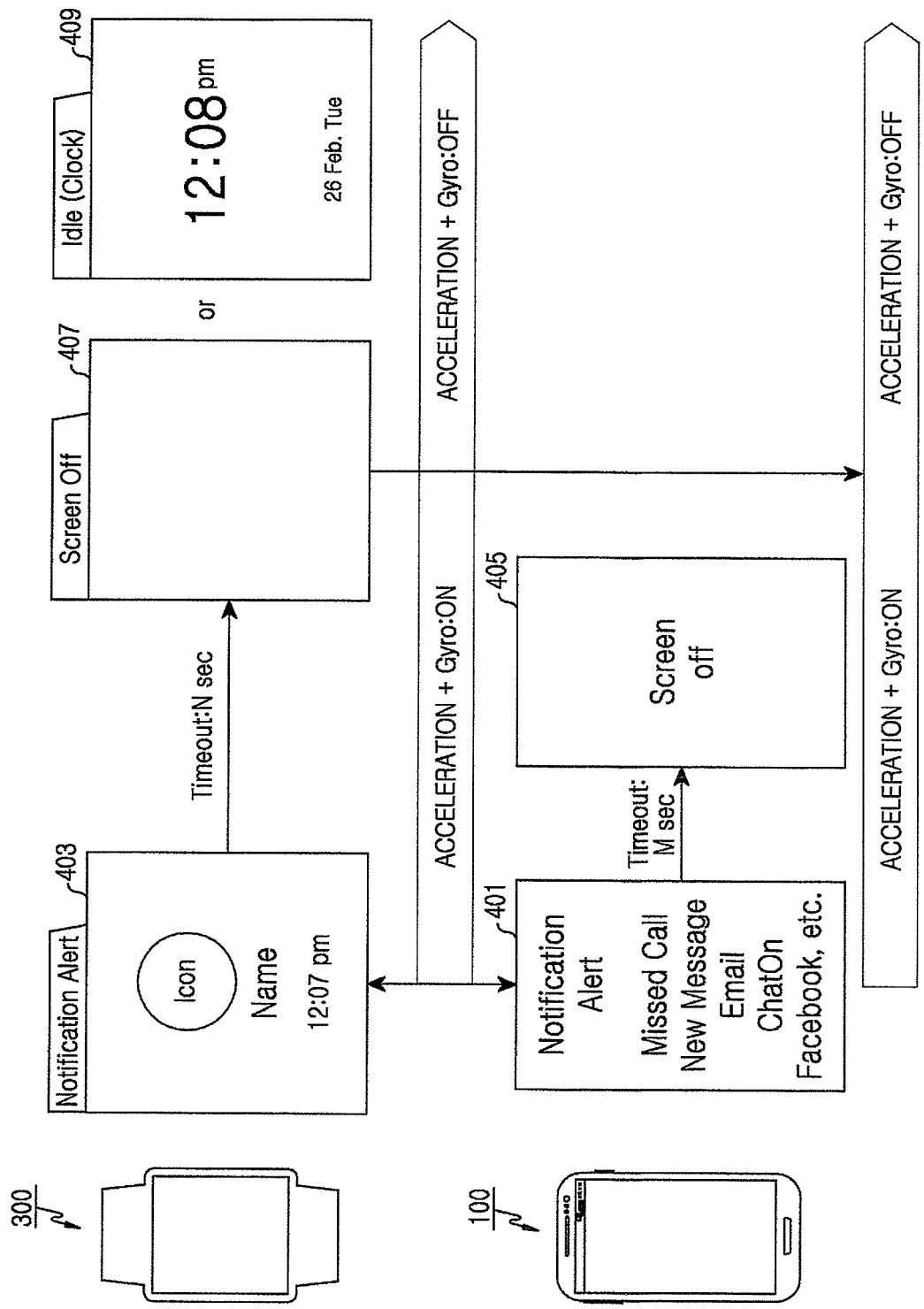
FIG. 4 illustrates an operation of a first electronic device and a second electronic device according to one example embodiment of FIG. 1.

FIG. 4 illustrates an operation of a first electronic device and a second electronic device according to one example embodiment of FIG. 1.

A second electronic device 300 may display received notification information to a display unit or may perform an operation of a second electronic device 300. If a combined motion with the first electronic device 100 is performed within a pre-set time (i.e., N seconds), the second electronic device 300 may transmit information including an instruction capable of controlling the first electronic device 100 in accordance with the received notification or the operation of the second electronic device 300 to the first electronic device 100.

According to various example embodiments, the second electronic device 300 may receive missed call notification information transmitted to the second electronic device 300 when missed call information is generated in the first electronic device 100, and may display the received missed call notification information to the display unit of the second electronic device 300. In this embodiment, sensors capable of detecting the combined motion of the first electronic device 100 may be in an 'ON' state.

The second electronic device 300 may display notification information to the display unit, and thereafter may perform the combined motion with the first electronic device 100 within a pre-set time (i.e., N seconds) to transmit a pre-set instruction capable of controlling the first electronic device 100 in association with the displayed notification to the first electronic device 100. The first electronic device 100 may display the content of a missed call to the display unit 131 of the first electronic device 100 according to received information. If there is an instruction defined as another operation, the instruction may be performed.

According to various example embodiments, the second electronic device 300 may receive notification information regarding reception of a new e-mail, and may display the received notification information to the display unit. In order to confirm the content of the e-mail from the first electronic device 100, the second electronic device 300 may transmit control information capable of tuning 'ON' the sensors of the first electronic device 100 to the first electronic device 100 such that the combined motion performed with the first electronic device 100 can be sensed.

The second electronic device 300 may display notification information to the display unit, and thereafter may perform the combined motion with the first electronic device 100 within a pre-set time (i.e., N seconds) to transmit a pre-set instruction capable of controlling the first electronic device 100 in association with the displayed notification to the first electronic device 100. The first electronic device 100 may display the content of an e-mail newly received through network communication to the display unit 131 of the first electronic device 100 according to received information.

The sensors of the first electronic device 100 may be in an 'OFF' state after notification information is displayed to the display unit of the second electronic device 300 and before a pre-set time (i.e., N seconds) elapses. The second electronic device 300 may detect a motion of the second electronic device 300 after confirming that the sensors of the first electronic device 100 is in the 'OFF' state, or if a motion of the second electronic device 300 is detected or if a wireless communication signal strength with the first electronic device 100 is greater than or equal to a pre-set strength, may transmit control information capable of turning 'ON' the sensors of the first electronic device 100 to the first electronic device 100.

After the second electronic device 300 displays the notification information to the display unit, if the combined motion with the first electronic device 100 is not performed within a pre-set time (i.e., N seconds), control information capable of turning 'OFF' the sensors of the first electronic device 100 may be transmitted to the first electronic device 100. The first electronic device 100 may turn 'OFF' the sensors which wait to perform the combined motion with the second electronic device 300.

The sensors described in the example embodiment of FIG. 4 may be one or more various sensors included in the first electronic device 100 and the second electronic device 300, such as an acceleration sensor, a tilt sensor, a gyroscope, a GPS, a light sensor, a pupil (or gaze) detection sensor, a brainwave detection sensor, and the like.

Figure 5:
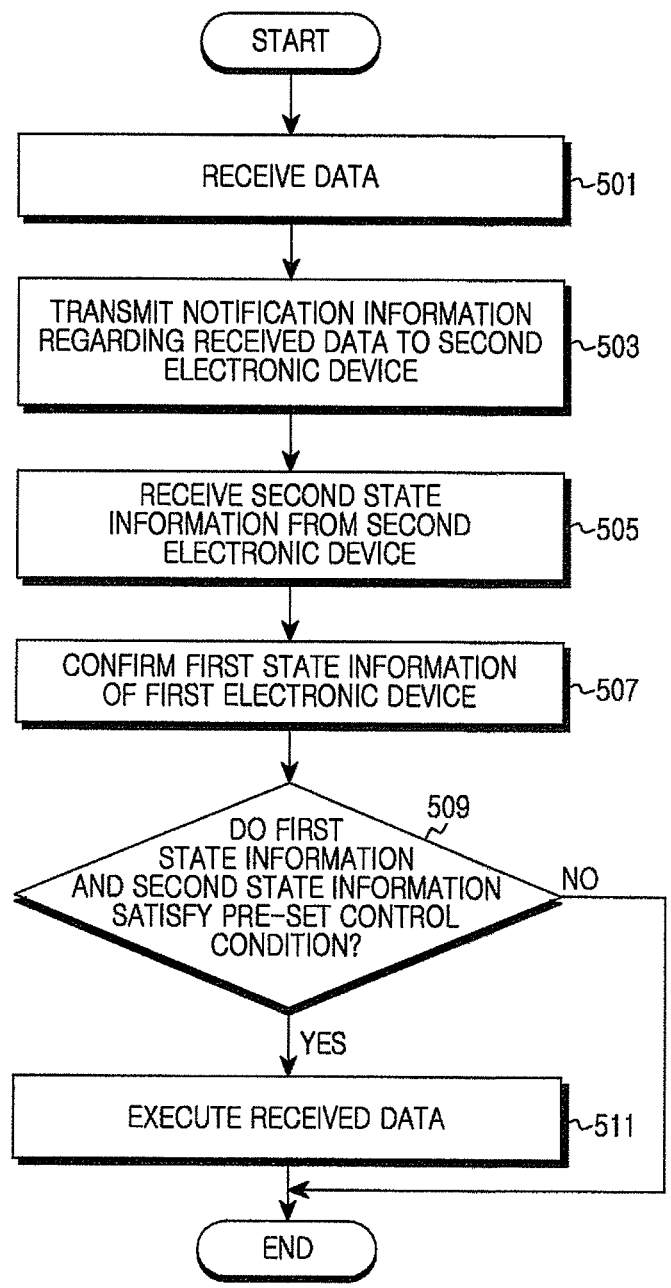
FIG. 5 illustrates a process of an operation of a first electronic device according to various example embodiments of FIG. 1.

FIG. 5 illustrates a process of an operation of a first electronic device according to various example embodiments of FIG. 1.

The first electronic device 100 may receive data regarding new information through network communication, may transmit notification information regarding the new information to the second electronic device 300, may determine whether a combined motion with the second electronic device 300 satisfies a control condition, may receive control information from the second electronic device 300, and may control the first electronic device 100 according to the received control information.

In an operation 501, the first electronic device 100 may receive data regarding the new information from a specific service through mobile communication.

According to one example embodiment, the first electronic device 100 may receive new SNS message data through network communication. According to one example embodiment, the first electronic device 100 may display notification information regarding the received SNS message to the display unit 131.

In an operation 503, the first electronic device 100 may transmit notification information regarding received new information to the second electronic device 300.

According to one example embodiment, the first electronic device 100 may transmit notification information regarding the SNS message received through network communication to the second electronic device 300. If the notification information is received, the second electronic device 300 may display to the display unit of the second electronic device 300 the notification information indicating that the first electronic device 100 receives the SNS message.

In an operation 505, the first electronic device 100 may perform a combined motion with the second electronic device 300. The first electronic device 100 may perform an operation related to the second electronic device 300, and may receive sensing information acquired from the second electronic device 300.

According to one example embodiment, the second electronic device 300 may acquire the sensing information via sensors included in the second electronic device 300 according to the combined motion. The second electronic device 300 may acquire measurement values (e.g., a tilt change, an acceleration change, a rotational inertia change, a location change, a light change, and the like) of the second electronic device 300 by using a sensor module such as an acceleration sensor, a tilt sensor, a gyroscope, and a light sensor, may acquire information regarding the motion of the second electronic device 300 in a 3D coordinate by using the measurement values, and may sense a user input by using a pupil (or gaze) detection sensor or a brainwave detection sensor.

The first electronic device 100 may receive the sensing information acquired by using the sensors from the second electronic device 300 through network communication.

In an operation 507, the first electronic device 100 may acquire state information of the first electronic device 100.

According to one example embodiment, the first electronic device 100 may acquire sensing information by using the sensors included in the first electronic device 100 according to the combined motion. The first electronic device 100 may acquire measurement values (e.g., a tilt change, an acceleration change, a rotational inertia change, a location change, a light change, and the like) of the first electronic device 100 by using the sensor module 160 such as the acceleration sensor 161, the tilt sensor 163, the gyroscope 162, and the light sensor, may acquire information regarding the motion of the first electronic device 100 in a 3D coordinate by using the measurement values, and may sense a user input by using a pupil (or gaze) detection sensor or a brainwave detection sensor.

According to one example embodiment, when the first electronic device 100 and the second electronic device 300 are connected with wireless communication such as Bluetooth communication, IrDA infrared communication, Wi-Fi communication, NFC communication, ZigBee communication, and the like, if an operation is performed in which the second electronic device 300 is approached to the first electronic device 100 to grab the first electronic device 100, it may be confirmed that a signal strength of the wireless communication through which the first electronic device 100 and the second electronic device 300 are connected becomes strong.

In an operation 509, the first electronic device 100 may determine whether state information of the first electronic device and state information of the second electronic device 300 satisfy a pre-set control condition.

According to one example embodiment, the state information of the first electronic device 100 may be confirmed after the first electronic device 100 receives the state information of the second electronic device 300. According to one example embodiment, the state information of the first electronic device 100 and the state information of the second electronic device 300 may be compared to determine whether the compared information pieces satisfy pre-set information, and if the comparison result shows that the compared information pieces satisfy the pre-set information, data which is output from the second electronic device 300 or at least one piece of data related to the data may be output via the first electronic device 100.

The first electronic device 100 may use sensing information of the first electronic device 100 and the second electronic device 300 to determine whether one or more information pieces corresponding to several combined motions satisfy a pre-set control condition. The combined motions may include a time at which the first electronic device 100 and the second electronic device 300 start a motion, a trace on which the first electronic device 100 and the second electronic device 300 move, a time at which the first electronic device 100 and the second electronic device 300 stop the motion, a moment at which the first electronic device 100 and the second electronic device 300 vibrate, a time during which the first electronic device 100 and the second electronic device 300 vibrate, an operation in which an instruction is input to a touch screen of the first electronic device 100 and the second electronic device 300, and an operation of manipulating a button of the first electronic device 100 and the second electronic device 300. If the second electronic device 300 does not include a sensor module such as an acceleration sensor, a tilt sensor, and a gyroscope, the first electronic device 100 may determine whether a control condition is satisfied by using sensing information corresponding to a combined motion of the first electronic device 100 without receiving the sensing information from the second electronic device 300.

According to one example embodiment, the first electronic device 100 may determine whether the signal strength of wireless communication with the second electronic device 300 is greater than or equal to a pre-set signal strength, and if the signal strength of wireless communication is greater than or equal to the pre-set signal strength, may determine that a distance between the first electronic device 100 and the second electronic device 300 is within a range of a pre-set distance (i.e., a distance between the second electronic device 300 worn on a wrist and the electronic device grabbed by a hand), and may determine that the control condition is satisfied.

In an operation 511, if an operation performed by the first electronic device 100 and the second electronic device 300 satisfies the control condition, the first electronic device 100 may display the content of received SNS message data to the display unit 131 of the first electronic device 100.

According to one example embodiment, if the content of the SNS message data is displayed to the display unit 131, the first electronic device 100 may provide control to release the display of notification information on the SNS message data displayed to the display unit of the second electronic device 300 or to delete notification data.

When the operation 511 is performed, the first electronic device 100 may end the operations of FIG. 5.

Figure 6A:
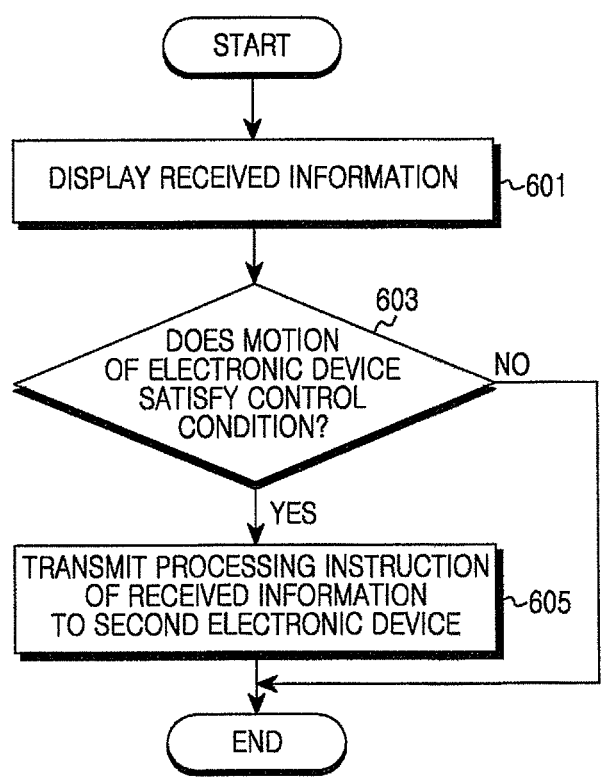
FIG. 6A and FIG. 6B illustrate processes of an operation of a second electronic device according to various example embodiments of FIG. 1.
Figure 6B:
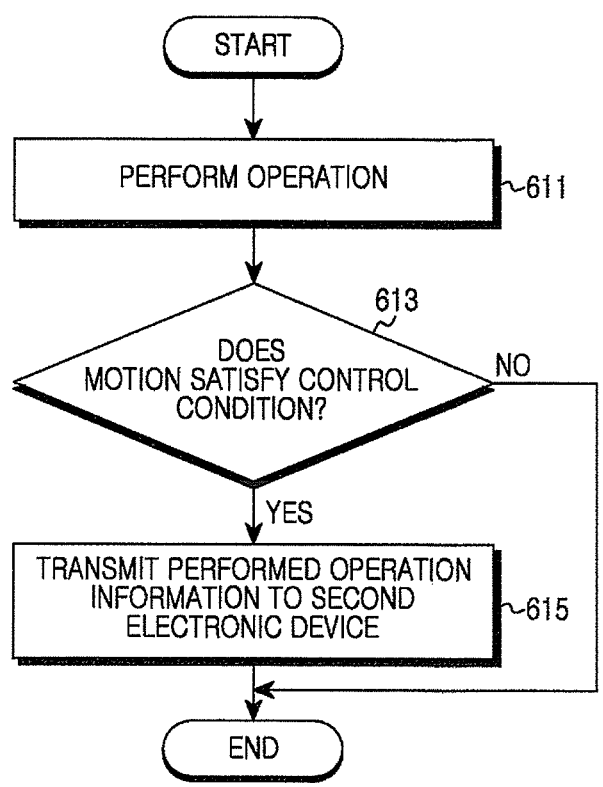

FIG. 6A and FIG. 6B illustrate processes of an operation of a second electronic device according to various example embodiments of FIG. 1.

The followings are described with reference to FIG. 6A.

The second electronic device 300 may receive data regarding new information through network communication, may determine whether a combined motion with the first electronic device 100 satisfies a control condition, and may transmit an instruction capable of performing a pre-set operation for new data to the first electronic device 100.

In an operation 601, the second electronic device 300 may receive data for the new information through mobile communication from a specific server or the first electronic device 100.

According to one example embodiment, the second electronic device 300 may receive new SNS message data through network communication. The second electronic device 300 may display notification information indicating reception of the SNS message to the display unit of the second electronic device 300. In addition to the displaying of the notification information indicating reception of the SNS message to the display unit, the second electronic device 300 may notify it through a sound such as voice via a speaker, and may notify it by generating a vibration of a specific pattern via a motor which generates a vibration included in the second electronic device 300.

According to one example embodiment, the second electronic device 300 may receive information for adding a new schedule from a specific server through network communication. The second electronic device 300 may display notification information indicating that the new schedule is added to a schedule management program (not shown) to the display unit of the second electronic device 300. In addition to the displaying of the notification information indicating the addition of the SNS message to the display unit, the second electronic device 300 may notify it through a sound such as voice via a speaker, and may notify it by generating a vibration of a specific pattern via a motor which generates a vibration included in the second electronic device 300.

According to one example embodiment, the second electronic device 300 may receive, from the first electronic device 100, notification information regarding a 1:1 text message talk connection request from a third electronic device, which is received by the first electronic device 100. The second electronic device 300 may display to the display unit the notification information regarding the 1:1 text message talk connection request from the third electronic device. In addition to the displaying of the notification information regarding the 1:1 text message talk connection request to the display unit, the second electronic device 300 may notify it through a sound such as voice via a speaker, and may notify it by generating a vibration of a specific pattern via a motor which generates a vibration included in the second electronic device 300.

In an operation 603, the second electronic device 300 may perform a combined motion with the first electronic device 100 to perform an operation of confirming received new information or an operation corresponding to the received information in the first electronic device 100. The second electronic device 300 may satisfy a control condition for transmitting control information to the first electronic device 100 for controlling to perform a pre-set operation corresponding to a notification received by performing a connected operation with the first electronic device 100.

According to one example embodiment, the second electronic device 300 may confirm state information of the second electronic device 300 in accordance with an operation of raising the second electronic device 300 worn on a left wrist of a user to confirm notification information displayed to the display unit, an operation of grabbing the first electronic device 100 to perform the combined motion, and an operation of confirming the content of notification displayed to the display unit 131 of the first electronic device 100.

According to one example embodiment, the second electronic device 300 may acquire the sensing information via sensors included in the second electronic device 300 according to the combined motion. The second electronic device 300 may acquire measurement values (e.g., a tilt change, an acceleration change, a rotational inertia change, a location change, a light change, and the like) of the second electronic device 300 by using a sensor module 160 such as an acceleration sensor, a tilt sensor, a gyroscope, and a light sensor, may acquire information regarding the motion of the second electronic device 300 in a 3D coordinate by using the measurement values, and may sense a user input by using a pupil (or gaze) detection sensor or a brainwave detection sensor.

The sensing information of the first electronic device 100 and the second electronic device 300 may be used to determine whether a pre-set control condition is satisfied by referring one or more information pieces corresponding to combined motions. The combined motions may include a time at which the first electronic device 100 and the second electronic device 300 start a motion, a trace on which the first electronic device 100 and the second electronic device 300 move, a time at which the first electronic device 100 and the second electronic device 300 stop the motion, a moment at which the first electronic device 100 and the second electronic device 300 vibrate, a time during which the first electronic device 100 and the second electronic device 300 vibrate, an operation in which an instruction is input to a touch screen of the first electronic device 100 and the second electronic device 300, and an operation of manipulating a button of the first electronic device 100 and the second electronic device 300.

If the sensing information corresponding to the operations of the second electronic device 300 and the first electronic device 100 is partially or entirely included in the same or similar range of the pre-set control condition, the second electronic device 300 may transmit control information capable of controlling the first electronic device 100 to the first electronic device 100.

According to one example embodiment, the first electronic device 100 may confirm state information of the first electronic device 100 in accordance with an operation of raising the second electronic device 300 worn on a wrist of a user to confirm notification information displayed to the display unit, an operation of approaching the second electronic device 300 attached to the wrist to the first electronic device 100 and of performing a combined motion by grabbing the first electronic device 100, and an operation of confirming the content of notification displayed to the display unit 131 of the first electronic device 100.

The first electronic device 100 may acquire measurement values (e.g., a tilt change, an acceleration change, a rotational inertia change, a location change, a light change, and the like) of the first electronic device 100 by using the sensor module 160 such as the acceleration sensor 161, the tilt sensor 163, the gyroscope 162, and the light sensor (not shown), may acquire information regarding the motion of the first electronic device 100 in a 3D coordinate by using the measurement values, and may sense a user input by using a pupil (or gaze) detection sensor or a brainwave detection sensor.

By using the sensing information of the first electronic device 100, the first electronic device 100 may determine whether a pre-set control condition is satisfied by referring one or more information pieces corresponding to combined motions. The combined motions may include a time at which the first electronic device 100 starts a motion, a trace on which the first electronic device 100 moves, a time at which the first electronic device 100 stops the motion, a moment at which the first electronic device 100 vibrates, a time at which the first electronic device 100 vibrates, an operation in which an instruction is input to a touch screen of the first electronic device 100, and an operation of manipulating a button of the first electronic device 100.

The second electronic device 300 may determine whether sensing information corresponding to the operations of the first electronic device 100 is partially or entirely included in the same or similar range of a pre-set control condition.

If it is determined that the sensing information corresponding to the operations of the second electronic device 300 and the first electronic device 100 is partially or entirely included in the same or similar range of the pre-set control condition, the second electronic device 300 may perform an operation 605, and otherwise, may end the operations of FIG. 6A.

In the operation 605, the second electronic device 300 may transmit new information of the operation 601 according to the combined motion of the operation 603 and pre-set control information that can be processed in the first electronic device 100 to the first electronic device 100.

According to one example embodiment, the second electronic device 300 may determine control information by including an instruction capable of confirming new SNS message data received through network communication in the first electronic device 100, and may transmit it to the first electronic device 100. The first electronic device 100 may display the content of the new SNS message to the display unit 131 of the first electronic device 100 according to the received control information, and may output the content of the new SNS message in a voice form via the speaker 141 according to the control information. If the received new SNS message data is data which cannot be confirmed by the first electronic device 100 through network communication, the second electronic device 300 may transmit the SNS message data included in the control information to the first electronic device 100. According to one example embodiment, an SNS message program of the first electronic device 100 may be used to create a response for the new SNS message and to transmit the response created in the first electronic device 100.

According to one example embodiment, the second electronic device 300 may include an instruction capable of confirming information for adding a new schedule received from a specific server through network communication in the first electronic device 100 to determine it as control information, and may transmit it to the first electronic device 100. The first electronic device 100 may receive a new schedule received by the second electronic device 300 from the specific server through network communication according to the control information and add the new schedule to a schedule management program (not shown), may display the content of the added new schedule to the display unit 131 of the first electronic device 100, and may output the content of the new schedule via the speaker 141 according to the control information. If there is a need to modify the new schedule added to the first electronic device 100, the schedule may be modified in the first electronic device 100, and the modified schedule may be transmitted to the specific server through network communication. The second electronic device 300 may receive the schedule modified in the first electronic device 100 from the specific server through network communication.

According to one example embodiment, the second electronic device 300 may determine control information for controlling such that a 1:1 text message talk connection request received by the first electronic device 100 from a third electronic device is accepted in the first electronic device 100, and then may transmit the control information to the first electronic device 100. The first electronic device 100 may accept the 1:1 text message talk connection request from the third electronic device according to the control information, may display the content of a 1:1 text message talk program (not shown) connected to the third electronic device to the display unit, and may perform a 1:1 text message talk with the third electronic device.

When the operation 605 is performed, the second electronic device 300 may end the operations of FIG. 6A.

The followings are described with reference to FIG. 6B.

The second electronic device 300 may operate one or more functions of the second electronic device 300, may determine whether a combined motion with the first electronic device 100 satisfies a control condition during an operation of a selected function, and may transmit an instruction capable of performing a pre-set operation with respect to the selected function to the first electronic device 100.

In an operation 611, the second electronic device 300 may operate one or more functions of the second electronic device 300 by using the application program 118 included in the memory 110.

According to one example embodiment, the second electronic device 300 may give a voice instruction to play back media data included in the memory of the second electronic device 300 via a microphone. The second electronic device 300 may execute a program capable of playing back the media data according to the input voice instruction, may play back the media data, and may display information on an operation for playing back the media data to the display unit. In addition to the displaying of the information on the operation of playing back the media data to the display unit, the second electronic device 300 may notify it through a sound such as voice via a speaker, and may notify it by generating a vibration of a specific pattern via a motor which generates a vibration included in the second electronic device 300.

In an operation 613, the second electronic device 300 may perform a combined motion with the first electronic device 100 such that a function currently being operated is performed in the first electronic device 100. The second electronic device 300 may satisfy a control condition for transmitting to the first electronic device 100 control information for controlling to perform a function currently being operated in the second electronic device 300 by performing an operation related to the first electronic device 100.

According to one example embodiment, the second electronic device 300 may confirm state information of the second electronic device 300 corresponding to an operation of instructing the execution of the function of the second electronic device 300 by raising the second electronic device 300 worn on a wrist of a user, and an operation of grabbing the first electronic device 100 and performing a combined motion.

The second electronic device 300 may acquire the sensing information via sensors included in the second electronic device 300 according to the combined motion. The second electronic device 300 may acquire measurement values (e.g., a tilt change, an acceleration change, a rotational inertia change, a location change, a light change, and the like) of the second electronic device 300 by using a sensor module such as an acceleration sensor, a tilt sensor, a gyroscope, and a light sensor, and may acquire information regarding the motion of the second electronic device 300 in a 3D coordinate by using the measurement values.

When it is determined that the first electronic device 100 and the second electronic device 300 are connected through Bluetooth communication, IrDA infrared communication, Wi-Fi communication, NFC communication, ZigBee communication, and the like, if an operation is performed in which the first electronic device 100 is approached to grab the first electronic device 100, the second electronic device 300 may confirm that a signal strength of wireless communication through which the first electronic device 100 and the second electronic device 300 are connected becomes strong. The second electronic device 300 may confirm that the signal strength of wireless communication is greater than or equal to a pre-set signal strength, and may determine that a distance between the first electronic device 100 and the second electronic device 300 is within a range of a pre-set distance (i.e., a distance between the second electronic device 300 worn on a wrist and the first electronic device 100 grabbed by a hand).

The second electronic device 300 may determine whether sensing information corresponding to an operation of raising the second electronic device 300 worn on a wrist of a user and inputting an instruction to a microphone and an operation of approaching to the first electronic device 100 and performing a combined motion of shaking by a specific number of times in a specific direction at a location close to the first electronic device 100 is partially or entirely included in the same or similar range of a pre-set control condition.

If it is determined that the combined motion performed in the second electronic device 300 is partially or entirely included in the same or similar range of the pre-set control condition, the second electronic device 300 may perform an operation 615, and otherwise may end the operations of FIG. 6B.

In the operation 615, the second electronic device 300 may transmit to the first electronic device 100 the sensing information corresponding to the combined motion of the operation 613.

If the second electronic device 300 approaches to the first electronic device 100 and determines that the signal strength of network communication is greater than or equal to the pre-set strength, and if sensing information corresponding to the combined motion performed by the second electronic device 300 is partially or entirely included in the same or similar range of the pre-set control condition, the second electronic device 300 may transmit the sensing information measured in the second electronic device 300 to the first electronic device 100. If a sensor module (e.g., an acceleration sensor, a tilt sensor, a gyroscope) is not included, the second electronic device 300 may not perform an operation of transmitting the sensing information of the second electronic device 300 to the first electronic device 100.

When the operation 615 is performed, the second electronic device 300 may end the operations of FIG. 6B.

According to the aforementioned various example embodiments, when determining a first electronic device controlled via a second electronic device, since the first electronic device may be selected and controlled with a gesture or motion agreed between the first electronic device and the second electronic device, security can be enforced by avoiding an accident of data leakage, and an operation of selecting the second electronic device for controlling can be decreased.

According to various example embodiments of the present disclosure, when the first electronic device 100 and the second electronic device 300 perform an operation, the operation to be performed may be an operation performed by both the first electronic device 100 and the second electronic device 300 and may be an operation performed by either the first electronic device 100 or the second electronic device 300.

According to various example embodiments, the first electronic device 100 may transmit a notification for a generated event to the second electronic device 300, and the second electronic device 300 may output a notification for an event received from the first electronic device 100. The first electronic device 100 may confirm state information of the second electronic device 300. If the confirmed state information of the second electronic device and/or state information of the first electronic device satisfy a pre-set control condition, the first electronic device may perform a generated event or a function related to the generated event in the first electronic device 100. According to one example embodiment, the state information of the second electronic device 300 and confirmed in the first electronic device 100 may be information regarding whether the signal strength of wireless communication connected to the second electronic device 300 is greater than or equal to the pre-set signal strength. According to one example embodiment, the state information of the first electronic device 100 may be combined motion information based on at least one piece of sensing information sensed by at least one sensing module included in the first electronic device 100. According to one example embodiment, after transmitting a notification on a generated event to the second electronic device 300, if a motion of the first electronic device 100 is sensed within a pre-set time, the first electronic device 100 may confirm the state information of the second electronic device 300. According to one example embodiment, the first electronic device 100 may skip an operation of confirming the state information of the first electronic device 100 or the second electronic device 300.

According to various example embodiments, the first electronic device 100 may transmit the notification on the generated event to the second electronic device 300, and may confirm the state information of the first electronic device 100. On the basis of the confirmation result, an event transmitted from the second electronic device or a function related to the event may be performed in the first electronic device. According to one example embodiment, the first electronic device 100 may transmit the notification on the generated vent to the second electronic device 300. If a motion of the first electronic device is sensed within a pre-set time after transmitting the notification to the second electronic device 300, the event generated in the first electronic device 100 or the function related to the event may be output in the first electronic device 100. According to one example embodiment, the first electronic device 100 may transmit the notification on the generated event to the second electronic device 300, and may confirm the signal strength of wireless communication connected with the second electronic device 300. Upon sensing the motion of the first electronic device 100 in a state where the confirmed signal strength satisfies the pre-set signal strength, the event generated in the first electronic device 100 or the function related to the event may be output in the first electronic device 100.

According to various example embodiments, the event generated in the first electronic device 100 may be determined to one or more functions executable in the first electronic device 100, for example, calling, missed call notification, message reception notification, e-mail reception notification, schedule confirm notification, alarm confirm notification, multimedia playback, voice memo, address search, and the like.

Methods based on the embodiments disclosed in the claims and/or specification of the present disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the second electronic device 300. The one or more programs include instructions for allowing the second electronic device 300 to execute the methods based on the embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory may be plural in number.

Further, the program can be stored in an attachable storage device capable of accessing the second electronic device 300 through a communication network such as the Internet, an Intranet, a Local Area Network (LAN), a Wide LAN (WLAN), or a Storage Area Network (SAN) or a communication network configured by combining the networks. The storage device can access via an external port to the second electronic device 300.

In addition, an additional storage unit on a communication network can access to the portable second electronic device 300.

While the present disclosure has been particularly shown and described with reference to example embodiments thereof, it will be understood by those skilled in the art that various changes in form and details may be made therein without departing from the spirit and scope of the present disclosure as defined by the appended claims.

What is claimed is:

1. A method performed by a first electronic device, the method comprising:
    detecting an event in the first electronic device;
    in response to detecting the event, controlling a second electronic device such that a notification of the event received from the first electronic device by a second electronic device is displayed in a display of the second electronic device, by transmitting the notification of the event to the second electronic device, wherein the notification of the event is information for requesting a notification based on the event;
    receiving state information of the second electronic device from the second electronic device, wherein the state information of the second electronic device is information sensed by the second electronic device after the notification is displayed in the display of the second electronic device;
    determining that state information of the first electronic device and the state information of the second electronic device correspond to pre-set state information; and
    displaying information corresponding to the event in the first electronic device based on the determination that the state information of the first electronic device and the state information of the second electronic device correspond to the pre-set state information, wherein the information corresponding to the event includes detailed content of the event in order to confirm the notification displayed in the display of the second electronic device.

2. The method of claim 1, wherein the event is receiving at least any one of a text message, a voice message, a multimedia message, an electronic mail, and a call connection request.

3. The method of claim 1, wherein receiving the state information of the second electronic device further comprises receiving a message regarding whether the notification of the event is confirmed in the second electronic device.

4. The method of claim 1, further comprising, after displaying the information corresponding to the event, requesting to delete the notification of the event in the second electronic device.

5. The method of claim 1, wherein determining that the state information of the first electronic device and the state information of the second electronic device correspond to pre-set state information is comparing whether motion information of the first electronic device and motion information of the second electronic device conform to reference information for a pre-set motion.

6. The method of claim 1,
    wherein the state information of the second electronic device is a strength of a short range wireless communication signal between the first electronic device and the second electronic device and provided from the second electronic device, and
    wherein the state information of the first electronic device is at least one of motion information which is sensed in the first electronic device, input information of a touch or physical key button, user's bodily action information, and the strength of the short range wireless communication signal between the first electronic device and the second electronic device.

7. The method of claim 6, wherein determining that the state information of the first electronic device and the state information of the second electronic device correspond to pre-set state information comprises: confirming the state information of the first electronic device is sensed based on the strength of the short range wireless communication signal based on the state information of the second electronic device that is greater than or equal to a pre-set strength.

8. A first electronic device comprising:
    a communication interface configured to communicate with a second electronic device; and
    at least one processor configured to:
        detect an event in the first electronic device;
        determine at least one of a received text message, a voice message, a multimedia message, an electronic mail, and a call connection request as the event
        in response to detecting the event, control the second electronic device such that a notification of the event received from the first electronic device by a second electronic device is displayed in a display of the second electronic device, by transmitting the notification of the event to the second electronic device;
        request the second electronic device to output a notification based on the event;
        receive, from the second electronic device, state information of the second electronic device as information sensed by the second electronic device after the notification is displayed in the display of the second electronic device;

determine that state information of the first electronic device and the state information of the second electronic device correspond to pre-set state information; and display information corresponding to the event in the first electronic device based on the determination that the state information of the first electronic device and the state information of the second electronic device correspond to the pre-set state information, wherein the information corresponding to the event includes detailed content of the event in order to confirm the notification displayed in the display of the second electronic device.

9. The first electronic device of claim 8, wherein the processor is configured to determine at least one of a received text message, a voice message, a multimedia message, an electronic mail, and a call connection request as the event.

10. The first electronic device of claim 8, wherein the processor is configured to receive a message regarding whether the notification of the event is confirmed in the second electronic device.

11. The first electronic device of claim 8, wherein the processor is configured to request to delete the notification of the event in the second electronic device after displaying the information corresponding to the event.

12. The first electronic device of claim 8, wherein the processor is configured to compare whether motion information of the first electronic device and motion information of the second electronic device conform to reference information for a pre-set motion.

13. The first electronic device of claim 8, wherein the processor is configured to receive from the second electronic device the state information of the second electronic device, including a strength of a short range wireless communication signal between the first electronic device and the second electronic device, and is configured to sense at least one of motion information which is sensed in the first electronic device, input information of a touch or physical key button, user's bodily action information, and the strength of the short range wireless communication signal between the first electronic device and the second electronic device, as the state information of the first electronic device.

14. The first electronic device of claim 13, wherein the processor is configured to confirm the state information of the first electronic device is sensed based on the strength of the short range wireless communication signal based on the state information of the second electronic device that is greater than or equal to a pre-set strength.

15. A second electronic device connected with a first electronic device, the second electronic device comprising:
a communication interface configured to communicate with the first electronic device; and
at least one processor configured to:
in response to receiving, from the first electronic device, a notification of an event detected in the first electronic device, display the notification of the event in a display of the second electronic device, wherein the notification of the event is information for requesting a notification based on the event;
detect state information of the second electronic device, wherein the state information of the second electronic device is information sensed by the second electronic device after the notification is displayed in the display of the second electronic device;
determine that the state information of the first electronic device and the state information of the second electronic device correspond to pre-set state information; and
transmit a message related to the state information and information corresponding to the event to the first electronic device based on the determination that the state information of the first electronic device and the state information of the second electronic device correspond to the pre-set state information, wherein the information corresponding to the event includes a pre-set instruction that, when received by the first electronic device, controls the first electronic device to display, in a display of the first electronic device, detailed content in association with the notification displayed in the display of the second electronic device.

16. The second electronic device of claim 15, wherein the processor is configured to display the notification of the event by displaying at least one of a text message, a voice message, a multimedia message, and an electronic mail or by playing back a multimedia.

17. The second electronic device of claim 15, wherein the processor is configured to:
determine at least one of motion information which is sensed in the second electronic device,
input information of a touch or physical key button, user's bodily action information, and a strength of a short range wireless communication signal between the first electronic device and the second electronic device, as the state information.

18. The second electronic device of claim 15, wherein the processor is configured to:
compare a strength of a short range wireless communication signal between the second electronic device and the first electronic device to a pre-set strength; and
determine the strength of the short range wireless communication signal is greater than or equal to the pre-set strength based on the comparison.

* * * * *